United States Patent
Apte et al.

(10) Patent No.: US 10,670,716 B2
(45) Date of Patent: Jun. 2, 2020

(54) OPERATING A TWO-DIMENSIONAL ARRAY OF ULTRASONIC TRANSDUCERS

(71) Applicant: InvenSense, Inc., San Jose, CA (US)

(72) Inventors: Nikhil Apte, Palo Alto, CA (US); Julius Ming-Lin Tsai, San Jose, CA (US); Michael Julian Daneman, Campbell, CA (US); Renata Melamud Berger, Palo Alto, CA (US)

(73) Assignee: InvenSense, Inc., San Jose, CA (US)

( * ) Notice: Subject to any disclaimer, the term of this patent is extended or adjusted under 35 U.S.C. 154(b) by 176 days.

(21) Appl. No.: 15/266,673

(22) Filed: Sep. 15, 2016

(65) Prior Publication Data

US 2017/0322305 A1 Nov. 9, 2017

Related U.S. Application Data

(60) Provisional application No. 62/334,388, filed on May 10, 2016, provisional application No. 62/334,390, (Continued)

(51) Int. Cl.
*G01S 15/06* (2006.01)
*G10K 11/34* (2006.01)
*B06B 1/06* (2006.01)

(52) U.S. Cl.
CPC ............ *G01S 15/06* (2013.01); *B06B 1/0622* (2013.01); *G10K 11/346* (2013.01)

(58) Field of Classification Search
None
See application file for complete search history.

(56) References Cited

U.S. PATENT DOCUMENTS

| 5,575,286 A | 11/1996 | Weng et al. |
| 5,684,243 A | 11/1997 | Gururaja et al. |

(Continued)

FOREIGN PATENT DOCUMENTS

| CN | 1826631 A | 8/2006 |
| CN | 102159334 A | 8/2011 |

(Continued)

OTHER PUBLICATIONS

ISA/EP, International Search Report and Written Opinion for International Application No. PCT/US2017/031140, 18 pages, Nov. 2, 2017 (Feb. 11, 2017).

(Continued)

*Primary Examiner* — Hovhannes Baghdasaryan

(57) ABSTRACT

In a method of operating a two-dimensional array of ultrasonic transducers, a plurality of array positions comprising pluralities of ultrasonic transducers of the two-dimensional array of ultrasonic transducers is defined, the plurality of array positions each comprising a portion of ultrasonic transducers of the two dimensional array of ultrasonic transducers. For each array position of the plurality of array positions, a plurality of ultrasonic transducers associated with the respective array position are activated. The activation includes transmitting ultrasonic signals from a first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers, the first group of ultrasonic transducers for forming a focused ultrasonic beam. The activation also includes receiving reflected ultrasonic signals at a second group of ultrasonic transducers of the plurality of ultrasonic transducers.

33 Claims, 24 Drawing Sheets

Related U.S. Application Data filed on May 10, 2016, provisional application No. 62/331,919, filed on May 4, 2016.

(56) References Cited

U.S. PATENT DOCUMENTS

| | | | |
|---|---|---|---|
| 5,808,967 A | 9/1998 | Yu et al. | |
| 5,867,302 A | 2/1999 | Fleming | |
| 5,911,692 A | 6/1999 | Hussain et al. | |
| 6,071,239 A | 6/2000 | Cribbs et al. | |
| 6,104,673 A | 8/2000 | Cole et al. | |
| 6,289,112 B1 | 9/2001 | Jain et al. | |
| 6,350,652 B1 | 2/2002 | Libera et al. | |
| 6,428,477 B1 | 8/2002 | Mason | |
| 6,500,120 B1 | 12/2002 | Anthony | |
| 6,676,602 B1 | 1/2004 | Barnes et al. | |
| 6,736,779 B1 | 5/2004 | Sano et al. | |
| 7,067,962 B2 | 6/2006 | Scott | |
| 7,109,642 B2 | 9/2006 | Scott | |
| 7,243,547 B2 | 7/2007 | Cobianu et al. | |
| 7,400,750 B2 | 7/2008 | Nam | |
| 7,459,836 B2 | 12/2008 | Scott | |
| 7,471,034 B2 | 12/2008 | Schlote-Holubek et al. | |
| 7,489,066 B2 | 2/2009 | Scott et al. | |
| 7,739,912 B2 | 6/2010 | Schneider et al. | |
| 8,018,010 B2 | 9/2011 | Tigli et al. | |
| 8,139,827 B2 | 3/2012 | Schneider et al. | |
| 8,311,514 B2 | 11/2012 | Bandyopadhyay et al. | |
| 8,335,356 B2 | 12/2012 | Schmitt | |
| 8,433,110 B2 | 4/2013 | Kropp et al. | |
| 8,508,103 B2 | 8/2013 | Schmitt et al. | |
| 8,515,135 B2 | 8/2013 | Clarke et al. | |
| 8,666,126 B2 | 3/2014 | Lee et al. | |
| 8,703,040 B2 | 4/2014 | Liufu et al. | |
| 8,723,399 B2 | 5/2014 | Sammoura et al. | |
| 8,805,031 B2 | 8/2014 | Schmitt | |
| 9,056,082 B2 | 6/2015 | Liautaud et al. | |
| 9,070,861 B2 | 6/2015 | Bibl et al. | |
| 9,224,030 B2 | 12/2015 | Du et al. | |
| 9,245,165 B2 | 1/2016 | Slaby et al. | |
| 9,424,456 B1 | 8/2016 | Kamath Koteshwara et al. | |
| 9,572,549 B2 * | 2/2017 | Belevich | A61B 8/587 |
| 9,582,102 B2 | 2/2017 | Setlak | |
| 9,607,203 B1 | 3/2017 | Yazdandoost et al. | |
| 9,607,206 B2 | 3/2017 | Schmitt et al. | |
| 9,613,246 B1 | 4/2017 | Gozzini et al. | |
| 9,665,763 B2 | 5/2017 | Du et al. | |
| 9,747,488 B2 | 8/2017 | Yazdandoost et al. | |
| 9,785,819 B1 | 10/2017 | Oreifej | |
| 9,815,087 B2 | 11/2017 | Ganti et al. | |
| 9,817,108 B2 | 11/2017 | Kuo et al. | |
| 9,818,020 B2 | 11/2017 | Schuckers et al. | |
| 9,881,195 B2 | 1/2018 | Lee et al. | |
| 9,881,198 B2 | 1/2018 | Lee et al. | |
| 9,898,640 B2 | 2/2018 | Ghavanini | |
| 9,904,836 B2 | 2/2018 | Yeke Yazdandoost et al. | |
| 9,909,225 B2 | 3/2018 | Lee et al. | |
| 9,922,235 B2 | 3/2018 | Cho et al. | |
| 9,934,371 B2 | 4/2018 | Hong et al. | |
| 9,939,972 B2 | 4/2018 | Shepelev et al. | |
| 9,953,205 B1 | 4/2018 | Rasmussen et al. | |
| 9,959,444 B2 | 5/2018 | Young et al. | |
| 9,967,100 B2 | 5/2018 | Hong et al. | |
| 9,983,656 B2 | 5/2018 | Merrell et al. | |
| 9,984,271 B1 | 5/2018 | King et al. | |
| 10,275,638 B1 | 4/2019 | Yousefpor et al. | |
| 10,315,222 B2 | 6/2019 | Salvia et al. | |
| 10,600,403 B2 | 3/2020 | Garlepp et al. | |
| 2002/0135273 A1 | 9/2002 | Mauchamp et al. | |
| 2003/0013955 A1 | 1/2003 | Poland | |
| 2004/0085858 A1 | 5/2004 | Khuri-Yakub et al. | |
| 2004/0122316 A1 | 6/2004 | Satoh et al. | |
| 2004/0174773 A1 * | 9/2004 | Thomenius | B06B 1/0292 367/174 |
| 2005/0057284 A1 | 3/2005 | Wodnicki | |
| 2005/0100200 A1 | 5/2005 | Abiko et al. | |
| 2005/0110071 A1 | 5/2005 | Ema et al. | |
| 2005/0146240 A1 | 7/2005 | Smith et al. | |
| 2005/0148132 A1 | 7/2005 | Wodnicki et al. | |
| 2005/0162040 A1 | 7/2005 | Robert | |
| 2006/0052697 A1 | 3/2006 | Hossack et al. | |
| 2006/0079777 A1 | 4/2006 | Karasawa | |
| 2007/0046396 A1 | 3/2007 | Huang | |
| 2007/0047785 A1 | 3/2007 | Jang et al. | |
| 2007/0073135 A1 | 3/2007 | Lee et al. | |
| 2007/0202252 A1 | 8/2007 | Sasaki | |
| 2007/0215964 A1 | 9/2007 | Khuri-Yakub et al. | |
| 2007/0230754 A1 | 10/2007 | Jain et al. | |
| 2008/0125660 A1 * | 5/2008 | Yao | A61B 8/06 600/459 |
| 2008/0150032 A1 | 6/2008 | Tanaka | |
| 2008/0194053 A1 | 8/2008 | Huang | |
| 2008/0240523 A1 | 10/2008 | Benkley et al. | |
| 2009/0005684 A1 | 1/2009 | Kristoffersen et al. | |
| 2009/0182237 A1 | 7/2009 | Angelsen et al. | |
| 2009/0274343 A1 | 11/2009 | Clarke | |
| 2009/0303838 A1 | 12/2009 | Svet | |
| 2010/0030076 A1 * | 2/2010 | Vortman | A61N 7/02 600/439 |
| 2010/0046810 A1 | 2/2010 | Yamada | |
| 2010/0168583 A1 | 7/2010 | Dausch et al. | |
| 2010/0195851 A1 | 8/2010 | Buccafusca | |
| 2010/0201222 A1 | 8/2010 | Adachi et al. | |
| 2010/0202254 A1 | 8/2010 | Roest et al. | |
| 2010/0239751 A1 | 9/2010 | Regniere | |
| 2010/0251824 A1 | 10/2010 | Schneider et al. | |
| 2010/0256498 A1 | 10/2010 | Tanaka | |
| 2010/0278008 A1 | 11/2010 | Ammar | |
| 2011/0285244 A1 | 11/2011 | Lewis et al. | |
| 2011/0291207 A1 | 12/2011 | Martin et al. | |
| 2012/0016604 A1 | 1/2012 | Irving et al. | |
| 2012/0092026 A1 | 4/2012 | Liautaud et al. | |
| 2012/0095347 A1 * | 4/2012 | Adam | A61B 8/12 600/459 |
| 2012/0147698 A1 | 6/2012 | Wong et al. | |
| 2012/0232396 A1 | 9/2012 | Tanabe | |
| 2012/0238876 A1 | 9/2012 | Tanabe et al. | |
| 2012/0279865 A1 | 11/2012 | Regniere et al. | |
| 2012/0288641 A1 | 11/2012 | Diatezua et al. | |
| 2013/0051179 A1 | 2/2013 | Hong | |
| 2013/0064043 A1 | 3/2013 | Degertekin et al. | |
| 2013/0127592 A1 | 5/2013 | Fyke et al. | |
| 2013/0133428 A1 | 5/2013 | Lee et al. | |
| 2013/0201134 A1 | 8/2013 | Schneider et al. | |
| 2013/0294202 A1 | 11/2013 | Hajati | |
| 2014/0060196 A1 | 3/2014 | Falter et al. | |
| 2014/0117812 A1 | 5/2014 | Hajati | |
| 2014/0176332 A1 | 6/2014 | Alameh et al. | |
| 2014/0208853 A1 | 7/2014 | Onishi et al. | |
| 2014/0219521 A1 | 8/2014 | Schmitt et al. | |
| 2014/0232241 A1 | 8/2014 | Hajati | |
| 2014/0265721 A1 | 9/2014 | Robinson et al. | |
| 2014/0355387 A1 | 12/2014 | Kitchens et al. | |
| 2015/0036065 A1 | 2/2015 | Yousefpor et al. | |
| 2015/0049590 A1 | 2/2015 | Rowe et al. | |
| 2015/0087991 A1 | 3/2015 | Chen et al. | |
| 2015/0097468 A1 | 4/2015 | Hajati et al. | |
| 2015/0145374 A1 | 5/2015 | Xu et al. | |
| 2015/0164473 A1 | 6/2015 | Kim et al. | |
| 2015/0165479 A1 | 6/2015 | Lasiter et al. | |
| 2015/0169136 A1 | 6/2015 | Ganti et al. | |
| 2015/0189136 A1 | 7/2015 | Chung et al. | |
| 2015/0198699 A1 | 7/2015 | Kuo et al. | |
| 2015/0206738 A1 | 7/2015 | Rastegar | |
| 2015/0213180 A1 | 7/2015 | Herberholz | |
| 2015/0220767 A1 | 8/2015 | Yoon et al. | |
| 2015/0261261 A1 | 9/2015 | Bhagavatula et al. | |
| 2015/0286312 A1 | 10/2015 | Kang et al. | |
| 2015/0345987 A1 | 12/2015 | Hajati | |
| 2016/0051225 A1 | 2/2016 | Kim et al. | |
| 2016/0063294 A1 | 3/2016 | Du et al. | |
| 2016/0086010 A1 | 3/2016 | Merrell et al. | |
| 2016/0092716 A1 | 3/2016 | Yazdandoost et al. | |
| 2016/0100822 A1 | 4/2016 | Kim et al. | |
| 2016/0107194 A1 | 4/2016 | Panchawagh et al. | |

(56) References Cited

U.S. PATENT DOCUMENTS

| | | |
|---|---|---|
| 2016/0180142 A1 | 6/2016 | Riddle et al. |
| 2016/0326477 A1 | 11/2016 | Fernandez-Alcon et al. |
| 2016/0358003 A1 | 12/2016 | Shen et al. |
| 2017/0330552 A1 | 1/2017 | Garlepp et al. |
| 2017/0075700 A1 | 3/2017 | Abudi et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0168543 A1 | 6/2017 | Dai et al. |
| 2017/0185821 A1 | 6/2017 | Chen et al. |
| 2017/0219536 A1 | 8/2017 | Koch et al. |
| 2017/0231534 A1 | 8/2017 | Agassy et al. |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0323133 A1 | 11/2017 | Tsai |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0357839 A1 | 12/2017 | Yazdandoost et al. |
| 2018/0206820 A1 | 7/2018 | Anand et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2019/0005300 A1 | 1/2019 | Garlepp et al. |
| 2019/0102046 A1 | 4/2019 | Miranto et al. |
| 2020/0030850 A1 | 1/2020 | Apte et al. |
| 2020/0074135 A1 | 3/2020 | Garlepp et al. |

FOREIGN PATENT DOCUMENTS

| | | |
|---|---|---|
| CN | 105264542 A | 1/2016 |
| EP | 1214909 A1 | 6/2002 |
| EP | 2884301 A1 | 6/2015 |
| JP | 2011040467 A | 2/2011 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015183945 A1 | 12/2015 |
| WO | 2016007250 A1 | 1/2016 |
| WO | 2016011172 A1 | 1/2016 |
| WO | 2016040333 A2 | 3/2016 |
| WO | 2016061406 A1 | 4/2016 |
| WO | 2017003848 A1 | 1/2017 |
| WO | 2017192895 A1 | 11/2017 |
| WO | 2017196678 A1 | 11/2017 |
| WO | 2017196682 A1 | 11/2017 |
| WO | 2017192903 A3 | 12/2017 |

OTHER PUBLICATIONS

ISA/EP, International Search Report for International Application No. PCT/US2017/031826, 16 pages, Feb. 27, 2018 (Feb. 27, 2018).

ISA/EP, Partial International Search Report for International Application No. PCT/US2017/031823, 12 pages, Nov. 30, 2017 (Nov. 30, 2017).

ISA/EP, International Search Report and Written Opinion for International Application No. PCT/US2017/031120, 12 pages, Aug. 29, 2017 (Aug. 29, 2017).

ISA/EP, International Search Report and Written Opinion for International Application No. PCT/US2017/031120, 13 pages, Sep. 1, 2017 (Sep. 1, 2017).

ISA/EP, International Search Report and Written Opinion for International Application No. PCT/US2017/031134, 12 pages, Aug. 30, 2017 (Aug. 30, 2017).

ISA/EP, International Search Report and Written Opinion for International Application No. PCT/US2017/031421 13 pages, Jun. 21, 2017 (Jun. 21, 2017).

ISA/EP, International Search Report and Written Opinion for International Application No. PCT/US2017/031426 13 pages, Jun. 22, 2017 (Jun. 22, 2017).

ISA/EP, International Search Report and Written Opinion for International Application No. PCT/US2017/031431, 14 pages, Aug. 1, 2017 (Aug. 1, 2017).

ISA/EP, International Search Report and Written Opinion for International Application No. PCT/US2017/031434, 13 pages, Jun. 26, 2017 (Jun. 26, 2017).

ISA/EP, International Search Report and Written Opinion for International Application No. PCT/US2017/031439, 10 pages, Jun. 20, 2017 (Jun. 20, 2017).

ISA/EP, International Search Report and Written Opinion for International Application No. PCT/US2017/031824, 18 pages, Sep. 22, 2017 (Sep. 22, 2017).

ISA/EP, International Search Report and Written Opinion for International Application No. PCT/US2017/031827, 16 pages, Aug. 1, 2017 (Aug. 1, 2017).

ISA/EP, International Search Report and Written Opinion for International Application No. PCT/US2017/031831, 12 pages, Jul. 21, 2017 (Jul. 21, 2017).

ISA/EP, Partial International Search Report for International Application No. PCT/US2017/031140, 13 pages, Aug. 29, 2017 (Aug. 29, 2017).

Rozen, et al., "Air-Coupled Aluminum Nitride Piezoelectric Micromachined Ultrasonic Transducers At 0.3 MHZ to 0.9 MHZ", 2015 28th IEEE International Conference on Micro Electro Mechanical Systems (MEMS), IEEE, Jan. 18, 2015, 921-924.

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hoperoft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

Tang, et al., "Pulse-Echo Ultrasonic Fingerprint Sensor on a Chip", IEEE Transducers, Anchorage, Alaska, USA, Jun. 21-25, 2015, pp. 674-677.

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

(56) References Cited

OTHER PUBLICATIONS

Savoia, et al., "Design and Fabrication of a cMUT Probe for Ultrasound Imaging of Fingerprints", 2010 IEEE International Ultrasonics Symposium Proceedings, Oct. 2010, 1877-1880.

"ISA/EP, International Search Report and Written Opinion for International Application # PCT/US2019/015020, pp. 1-23, dated Jul. 1, 2019".

"ISA/EP, International Search Report and Written Opinion for International Application # PCT/US2019/023440, pp. 1-10, dated Jun. 4, 2019".

Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.

Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.

Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.

Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.

Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.

Zhou, et al., "Partial Fingerprint Reconstruction with Improved Smooth Extension", Network and System Security, Springer Berlin Heidelberg, Jun. 3, 2013, 756-762.

ISA/EP, International Search Report and Written Opinion for International Application # PCT/US2018/063431, pp. 1-15, dated Feb. 5, 2019 (Feb. 5, 2019).

"Moving Average Filters", Waybackmachine XP05547422, Retrieved from the Internet: URL:https://web.archive.org/web/20170809081353/ https//www.analog.com/media/en/technical-documentation/dsp-book/ dsp_book_Ch15.pdf —[retrieved on Jan. 24, 2019], Aug. 9, 2017, 1-8.

"Receiver Thermal Noise Threshold", Fisher Telecommunication Services, Satellite Communications. Retrieved from the Internet: URL:https://web.archive.org/web/20171027075705/http//www. fishercom.xyz:80/satellite-communications/receiver-thermal-noise-threshold.html, Oct. 27, 2017, 3.

"Sleep Mode", Wikipedia, Retrieved from the Internet: URL:https:// web.archive.org/web/20170908153323/https://en.wikipedia.org/wiki/ Sleep_mode [retrieved on Jan. 25, 2019], Sep. 8, 2017, 1-3.

"TMS320C5515 Fingerprint Development Kit (FDK) Hardware Guide", Texas Instruments, Literature No. SPRUFX3, XP055547651, Apr. 2010, 1-26.

"ZTE V7 Max. 5,5" smartphone on MediaTeck Helio P10 cpu; Published on Apr. 20, 2016; https://www.youtube.com/watch?v= ncNCbpkGQzU (Year: 2016).

ISA/EP, Partial International Search Report for International Application No. PCT/US2019/034032, 8 pages, Sep. 12, 2019, 8.

ISA/EP, International Search Report and Written Opinion for International Application No. PCT/US2018/037364, 10 pages, Sep. 3, 2018.

Jiang, et al., "Ultrasonic Fingerprint Senseor with Transmit Beamforming Based on a PMUT Array Bonded to CMOS Circuitry", IEEE Transactions on Ultrasonics Ferroelectrics and Frequency Control, Jan. 1, 2017, 1-9.

Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasoni c+transducers+in+an+intelligent+data+acquisition+system&hl=en &as_sdt=0&as_vis=1&oi=scholart, 2003, 9-15.

"Office Action for CN App No. 201780029016.7 dated Mar. 24, 2020, 7 pp.".

\* cited by examiner

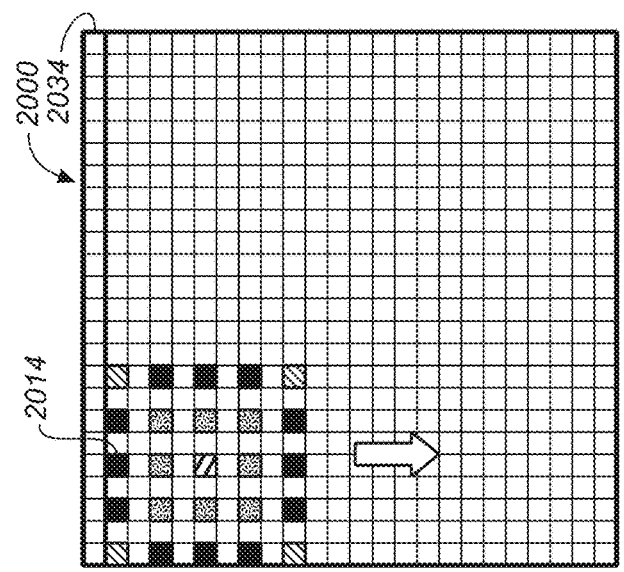
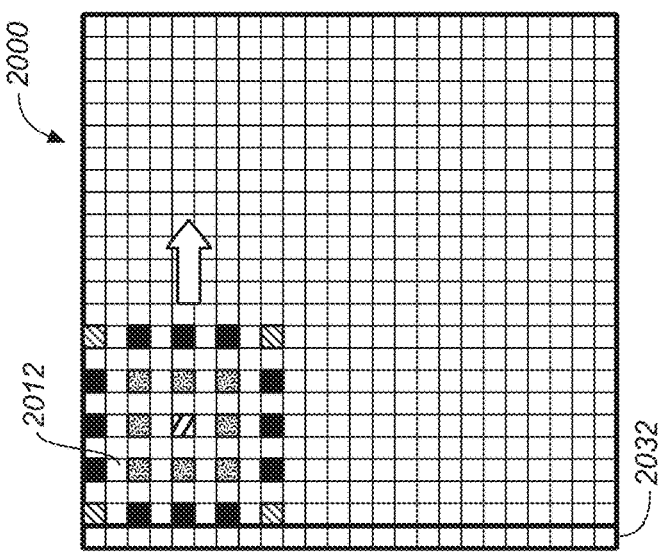
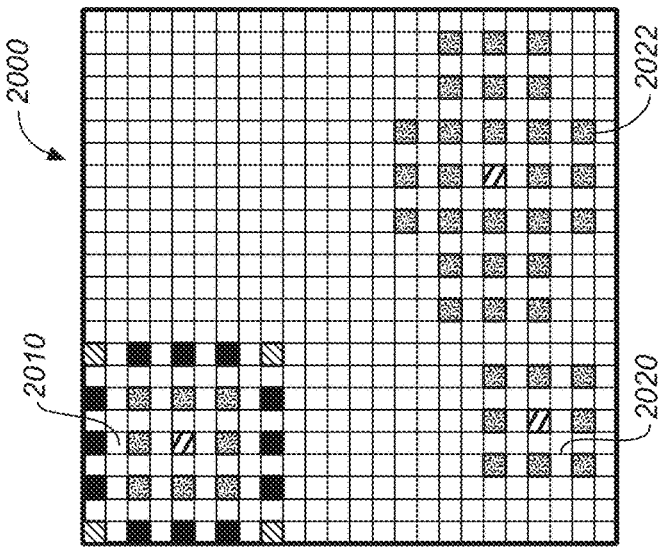
*FIG. 20C*
*FIG. 20B*
*FIG. 20A*

DEFINE A PLURALITY OF ARRAY POSITIONS COMPRISING PLURALITIES OF ULTRASONIC TRANSDUCERS OF THE TWO-DIMENSIONAL ARRAY OF ULTRASONIC TRANSDUCERS, THE PLURALITY OF ARRAY POSITIONS EACH COMPRISING A PORTION OF ULTRASONIC TRANSDUCERS OF THE TWO DIMENSIONAL ARRAY OF ULTRASONIC TRANSDUCERS.
3010

DEFINE AN ACTIVATION SEQUENCE OF THE PLURALITY OF ARRAY POSITIONS.
3012

FOR EACH ARRAY POSITION OF THE PLURALITY OF ARRAY POSITIONS, ACTIVATING A PLURALITY OF ULTRASONIC TRANSDUCERS ASSOCIATED WITH THE RESPECTIVE ARRAY POSITION.
3020

TRANSMIT ULTRASONIC SIGNALS FROM A FIRST GROUP OF ULTRASONIC TRANSDUCERS OF THE PLURALITY OF ULTRASONIC TRANSDUCERS, WHEREIN AT LEAST SOME ULTRASONIC TRANSDUCERS OF THE FIRST GROUP OF ULTRASONIC TRANSDUCERS ARE PHASE DELAYED WITH RESPECT TO OTHER ULTRASONIC TRANSDUCERS OF THE FIRST GROUP OF ULTRASONIC TRANSDUCERS, THE FIRST GROUP OF ULTRASONIC TRANSDUCERS FOR FORMING A FOCUSED ULTRASONIC BEAM
3030

RECEIVE REFLECTED ULTRASONIC SIGNALS AT A SECOND GROUP OF ULTRASONIC TRANSDUCERS OF THE PLURALITY OF ULTRASONIC TRANSDUCERS.
3040

OPERATING A TWO-DIMENSIONAL ARRAY OF ULTRASONIC TRANSDUCERS

RELATED APPLICATIONS

This application claims priority to and the benefit of co-pending U.S. Patent Provisional Patent Application 62/331,919, filed on May 4, 2016, entitled "PINNED ULTRASONIC TRANSDUCERS," by Ng et al., and assigned to the assignee of the present application, which is incorporated herein by reference in its entirety.

This application also claims priority to and the benefit of co-pending U.S. Patent Provisional Patent Application 62/334,388, filed on May 10, 2016, entitled "ULTRASONIC TRANSDUCERS SUPPORTING VIRTUAL BLOCK ARRAYS FOR BEAMFORMING," by Apte, having, and assigned to the assignee of the present application, which is incorporated herein by reference in its entirety.

This application also claims priority to and the benefit of co-pending U.S. Patent Provisional Patent Application 62/334,390, filed on May 10, 2016, entitled "ULTRASONIC TRANSDUCERS SUPPORTING BEAM-STEERING FOR ARRAY EDGES," by Apte, having, and assigned to the assignee of the present application, which is incorporated herein by reference in its entirety.

BACKGROUND

Piezoelectric materials facilitate conversion between mechanical energy and electrical energy. Moreover, a piezoelectric material can generate an electrical signal when subjected to mechanical stress, and can vibrate when subjected to a varying electrical voltage. Piezoelectric materials are widely utilized in piezoelectric ultrasonic transducers to generate acoustic waves based on an actuation voltage applied to electrodes of the piezoelectric ultrasonic transducer.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 16 illustrates an example phase delay pattern for a 9×9 ultrasonic transducer block, according to some embodiments.

FIG. 17 illustrates another example phase delay pattern for a 9×9 ultrasonic transducer block, according to some embodiments.

FIGS. 20A-C illustrate example transmitter blocks and receiver blocks for an array position in a two-dimensional array of ultrasonic transducers, according to some embodiments.

FIGS. 30, 30A and 30B illustrate a flow diagram of an example method for operating a two-dimensional array of ultrasonic transducers, according to various embodiments

DESCRIPTION OF EMBODIMENTS

Figure 1:
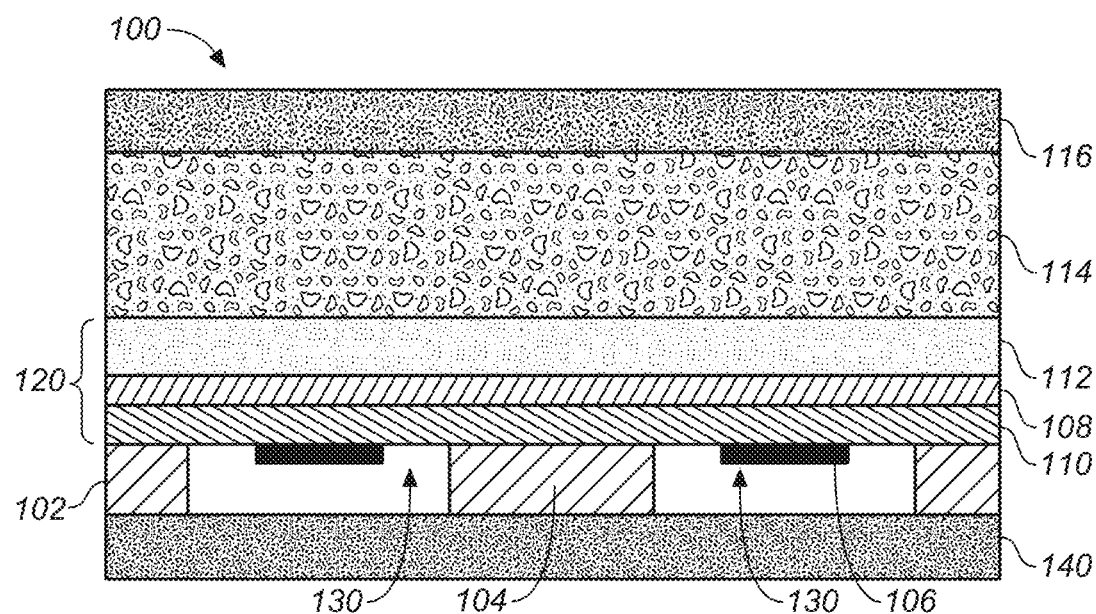
FIG. 1 is a diagram illustrating a PMUT device having a center pinned membrane, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "defining," "activating," "transmitting," "receiving," "sensing," "generating," "imaging," "performing," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAIVI), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example piezoelectric micromachined ultrasonic transducer (PMUT), in accordance with various embodiments. Example arrays including PMUT devices are then described. Example operations of example arrays of ultrasonic transducers (e.g., PMUT devices) are then further described.

Embodiments described herein relate to a method of operating a two-dimensional array of ultrasonic transducers. When an ultrasonic transducer, such as a PMUT device, transmits an ultrasonic signal, the ultrasonic signal typically does not transmit as a straight line. Rather, the ultrasonic signal will transmit to a wider area. For instance, when traveling through a transmission medium, the ultrasonic signal will diffract, thus transmitting to a wide area.

Embodiments described herein provide fingerprint sensing system including an array of ultrasonic transducers for sensing the fingerprint. In order to accurately sense a fingerprint, it is desirable to sense a high resolution image of the fingerprint. Using multiple ultrasonic transducers, some of which are time delayed with respect to other ultrasonic transducers, embodiments described herein provide for focusing a transmit beam (e.g., forming a beam) of an ultrasonic signal to a desired point, allowing for high resolution sensing of a fingerprint, or other object. For instance, transmitting an ultrasonic signal from multiple PMUTs, where some PMUTs transmit at a time delay relative to other PMUTs, provides for focusing the ultrasonic beam to a contact point of a fingerprint sensing system (e.g., a top of a platen layer) for sensing a high resolution image of a pixel associated with the transmitting PMUTs.

In accordance with various embodiments, a plurality of array positions comprising pluralities of ultrasonic transducers of the two-dimensional array of ultrasonic transducers is defined, the plurality of array positions each comprising a portion of ultrasonic transducers of the two dimensional array of ultrasonic transducers. For each array position of the plurality of array positions, a plurality of ultrasonic transducers associated with the respective array position are activated. The activation includes transmitting ultrasonic signals from a first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers, the first group of ultrasonic transducers for forming a focused ultrasonic beam. The activation also includes receiving reflected ultrasonic signals at a second group of ultrasonic transducers of the plurality of ultrasonic transducers.

In some embodiments, the phase delay pattern is symmetric about a focal point of the focused ultrasonic beam of the transmitting ultrasonic transducers. For example, such a phase delay pattern allows for sensing of a pixel at a center of the transmitting ultrasonic transducers and could be used for array positions within the two-dimensional array of ultrasonic transducers.

In other embodiments, the phase delay pattern of the transmitting ultrasonic transducers is asymmetric about a focal point of the focused ultrasonic beam of the transmitting ultrasonic transducers. For example, such a phase delay pattern allows for sensing of a pixel off-center of the transmitting ultrasonic transducers and could be used for array positions adjacent to an edge of the two-dimensional array of ultrasonic transducers. These embodiments may also be referred to as beam steering, as the phase delay pattern steers a focal point of the beam to a position off-center relative to the group of transmitting ultrasonic transducers.

In accordance with various embodiments, for each array position of the plurality of array positions, one pixel is sensed by focusing an ultrasonic beam, and that this pixel can be sensed using a symmetric phase delay pattern or an asymmetric phase delay pattern. In other embodiments, for each array position, multiple pixels can be sensed by focusing an ultrasonic beam to multiple positions relative to the transmitting ultrasonic transducers, using a combination of asymmetric delay patterns. In various embodiments, a symmetric phase delay pattern may also be used to sense a pixel for an array position. In other words, it should be appreciated that for an array position, one or more pixels can be sensed, allowing for increased resolution of the image sensing.

Piezoelectric Micromachined Ultrasonic Transducer (PMUT)

Systems and methods disclosed herein, in one or more aspects provide efficient structures for an acoustic transducer (e.g., a piezoelectric actuated transducer or PMUT). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. In addition, the word "example" is used herein to mean serving as an example, instance, or illustration.

FIG. 1 is a diagram illustrating a PMUT device 100 having a center pinned membrane, according to some embodiments. PMUT device 100 includes an interior pinned membrane 120 positioned over a substrate 140 to define a cavity 130. In one embodiment, membrane 120 is attached both to a surrounding edge support 102 and interior support 104. In one embodiment, edge support 102 is connected to an electric potential. Edge support 102 and interior support 104 may be made of electrically conducting materials, such as and without limitation, aluminum, molybdenum, or titanium. Edge support 102 and interior support 104 may also be made of dielectric materials, such as silicon dioxide, silicon nitride or aluminum oxide that have electrical connections the sides or in vias through edge support 102 or interior support 104, electrically coupling lower electrode 106 to electrical wiring in substrate 140.

In one embodiment, both edge support 102 and interior support 104 are attached to a substrate 140. In various embodiments, substrate 140 may include at least one of, and without limitation, silicon or silicon nitride. It should be appreciated that substrate 140 may include electrical wirings and connection, such as aluminum or copper. In one embodiment, substrate 140 includes a CMOS logic wafer bonded to edge support 102 and interior support 104. In one embodiment, the membrane 120 comprises multiple layers. In an example embodiment, the membrane 120 includes lower electrode 106, piezoelectric layer 110, and upper electrode 108, where lower electrode 106 and upper electrode 108 are coupled to opposing sides of piezoelectric layer 110. As shown, lower electrode 106 is coupled to a lower surface of piezoelectric layer 110 and upper electrode 108 is coupled to an upper surface of piezoelectric layer 110. It should be appreciated that, in various embodiments, PMUT device 100 is a microelectromechanical (MEMS) device.

In one embodiment, membrane 120 also includes a mechanical support layer 112 (e.g., stiffening layer) to mechanically stiffen the layers. In various embodiments, mechanical support layer 140 may include at least one of, and without limitation, silicon, silicon oxide, silicon nitride, aluminum, molybdenum, titanium, etc. In one embodiment, PMUT device 100 also includes an acoustic coupling layer 114 above membrane 120 for supporting transmission of acoustic signals. It should be appreciated that acoustic coupling layer can include air, solid liquid, gel-like materials, or other materials for supporting transmission of acoustic signals. In one embodiment, PMUT device 100 also includes platen layer 116 above acoustic coupling layer 114 for containing acoustic coupling layer 114 and providing a contact surface for a finger or other sensed object with PMUT device 100. It should be appreciated that, in various embodiments, acoustic coupling layer 114 provides a contact surface, such that platen layer 116 is optional. Moreover, it should be appreciated that acoustic coupling layer 114 and/or platen layer 116 may be included with or used in conjunction with multiple PMUT devices. For example, an array of PMUT devices may be coupled with a single acoustic coupling layer 114 and/or platen layer 116.

Figure 2:
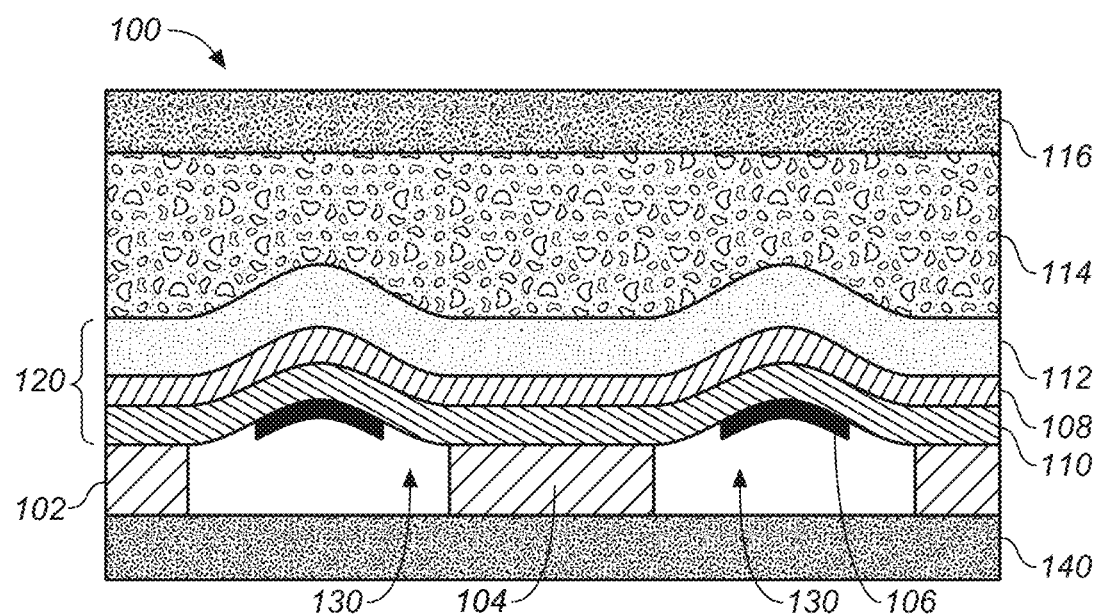
FIG. 2 is a diagram illustrating an example of membrane movement during activation of a PMUT device, according to some embodiments.

FIG. 2 is a diagram illustrating an example of membrane movement during activation of PMUT device 100, according to some embodiments. As illustrated with respect to FIG. 2, in operation, responsive to an object proximate platen layer 116, the electrodes 106 and 108 deliver a high frequency electric charge to the piezoelectric layer 110, causing those portions of the membrane 120 not pinned to the surrounding edge support 102 or interior support 104 to be displaced upward into the acoustic coupling layer 114. This generates a pressure wave that can be used for signal probing of the object. Return echoes can be detected as pressure waves causing movement of the membrane, with compression of the piezoelectric material in the membrane causing an electrical signal proportional to amplitude of the pressure wave.

The described PMUT device 100 can be used with almost any electrical device that converts a pressure wave into mechanical vibrations and/or electrical signals. In one aspect, the PMUT device 100 can comprise an acoustic sensing element (e.g., a piezoelectric element) that generates and senses ultrasonic sound waves. An object in a path of the generated sound waves can create a disturbance (e.g., changes in frequency or phase, reflection signal, echoes, etc.) that can then be sensed. The interference can be analyzed to determine physical parameters such as (but not limited to) distance, density and/or speed of the object. As an example, the PMUT device 100 can be utilized in various applications, such as, but not limited to, fingerprint or physiologic sensors suitable for wireless devices, industrial systems, automotive systems, robotics, telecommunications, security, medical devices, etc. For example, the PMUT device 100 can be part of a sensor array comprising a plurality of ultrasonic transducers deposited on a wafer, along with various logic, control and communication electronics. A sensor array may comprise homogenous or identical PMUT devices 100, or a number of different or heterogonous device structures.

In various embodiments, the PMUT device 100 employs a piezoelectric layer 110, comprised of materials such as, but not limited to, Aluminum nitride (AlN), lead zirconate titanate (PZT), quartz, polyvinylidene fluoride (PVDF), and/or zinc oxide, to facilitate both acoustic signal production and sensing. The piezoelectric layer 110 can generate electric charges under mechanical stress and conversely experience a mechanical strain in the presence of an electric field. For example, the piezoelectric layer 110 can sense mechanical vibrations caused by an ultrasonic signal and produce an electrical charge at the frequency (e.g., ultrasonic frequency) of the vibrations. Additionally, the piezoelectric layer 110 can generate an ultrasonic wave by vibrating in an oscillatory fashion that might be at the same frequency (e.g., ultrasonic frequency) as an input current generated by an alternating current (AC) voltage applied across the piezoelectric layer 110. It should be appreciated that the piezoelectric layer 110 can include almost any material (or combination of materials) that exhibits piezoelectric properties, such that the structure of the material does not have a center of symmetry and a tensile or compressive stress applied to the material alters the separation between positive and negative charge sites in a cell causing a polarization at the surface of the material. The polarization is directly proportional to the applied stress and is direction dependent so that compressive and tensile stresses results in electric fields of opposite polarizations.

Figure 10:
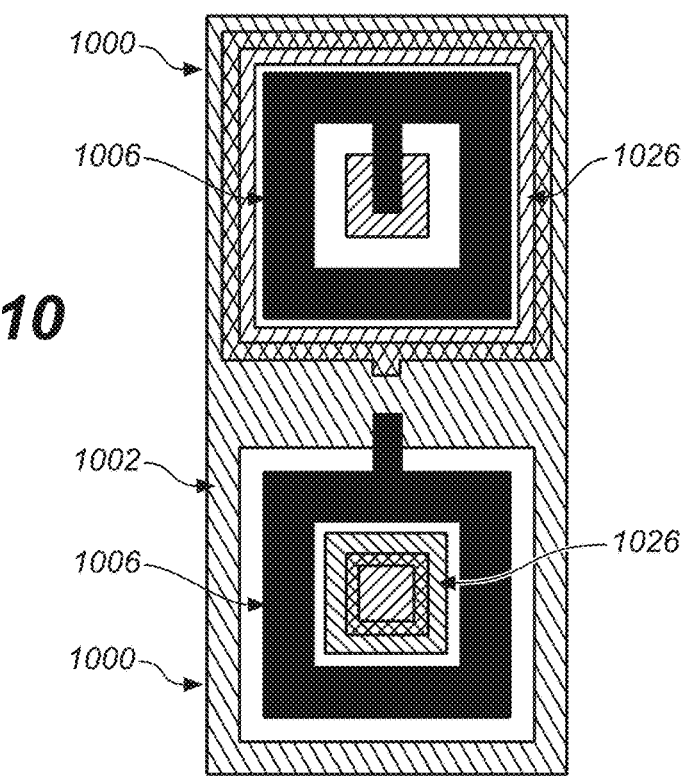
FIG. 10 illustrates an example pair of PMUT devices in a PMUT array, with each PMUT having differing electrode patterning, according to some embodiments.

Further, the PMUT device 100 comprises electrodes 106 and 108 that supply and/or collect the electrical charge to/from the piezoelectric layer 110. It should be appreciated that electrodes 106 and 108 can be continuous and/or patterned electrodes (e.g., in a continuous layer and/or a patterned layer). For example, as illustrated, electrode 106 is a patterned electrode and electrode 108 is a continuous electrode. As an example, electrodes 106 and 108 can be comprised of almost any metal layers, such as, but not limited to, Aluminum (Al)/Titanium (Ti), Molybdenum (Mo), etc., which are coupled with an on opposing sides of the piezoelectric layer 110. In one embodiment, PMUT device also includes a third electrode, as illustrated in FIG. 10 and described below.

According to an embodiment, the acoustic impedance of acoustic coupling layer 114 is selected to be similar to the acoustic impedance of the platen layer 116, such that the acoustic wave is efficiently propagated to/from the membrane 120 through acoustic coupling layer 114 and platen layer 116. As an example, the platen layer 116 can comprise various materials having an acoustic impedance in the range between 0.8 to 4 MRayl, such as, but not limited to, plastic, resin, rubber, Teflon, epoxy, etc. In another example, the platen layer 116 can comprise various materials having a high acoustic impedance (e.g., an acoustic impenence greater than 10 MRayl), such as, but not limited to, glass, aluminum-based alloys, sapphire, etc. Typically, the platen layer 116 can be selected based on an application of the sensor. For instance, in fingerprinting applications, platen layer 116 can have an acoustic impedance that matches (e.g., exactly or approximately) the acoustic impedance of human skin (e.g., $1.6 \times 10^6$ Rayl). Further, in one aspect, the platen layer 116 can further include a thin layer of anti-scratch material. In various embodiments, the anti-scratch layer of the platen layer 116 is less than the wavelength of the acoustic wave that is to be generated and/or sensed to provide minimum interference during propagation of the acoustic wave. As an example, the anti-scratch layer can comprise various hard and scratch-resistant materials (e.g., having a Mohs hardness of over 7 on the Mohs scale), such as, but not limited to sapphire, glass, MN, Titanium nitride (TiN), Silicon carbide (SiC), diamond, etc. As an example, PMUT device 100 can operate at 20 MHz and accordingly, the wavelength of the acoustic wave propagating through the acoustic coupling layer 114 and platen layer 116 can be 70-150 microns. In this example scenario, insertion loss can be reduced and acoustic wave propagation efficiency can be improved by utilizing an anti-scratch layer having a thickness of 1 micron and the platen layer 116 as a whole having a thickness of 1-2 millimeters. It is noted that the term "anti-scratch material" as used herein relates to a material that is resistant to scratches and/or scratch-proof and provides substantial protection against scratch marks.

In accordance with various embodiments, the PMUT device 100 can include metal layers (e.g., Aluminum (Al)/Titanium (Ti), Molybdenum (Mo), etc.) patterned to form electrode 106 in particular shapes (e.g., ring, circle, square, octagon, hexagon, etc.) that are defined in-plane with the membrane 120. Electrodes can be placed at a maximum strain area of the membrane 120 or placed at close to either or both the surrounding edge support 102 and interior support 104. Furthermore, in one example, electrode 108 can be formed as a continuous layer providing a ground plane in contact with mechanical support layer 112, which can be formed from silicon or other suitable mechanical stiffening material. In still other embodiments, the electrode 106 can be routed along the interior support 104, advantageously reducing parasitic capacitance as compared to routing along the edge support 102.

For example, when actuation voltage is applied to the electrodes, the membrane 120 will deform and move out of plane. The motion then pushes the acoustic coupling layer 114 it is in contact with and an acoustic (ultrasonic) wave is generated. Oftentimes, vacuum is present inside the cavity 130 and therefore damping contributed from the media within the cavity 130 can be ignored. However, the acoustic coupling layer 114 on the other side of the membrane 120 can substantially change the damping of the PMUT device 100. For example, a quality factor greater than 20 can be observed when the PMUT device 100 is operating in air with atmosphere pressure (e.g., acoustic coupling layer 114 is air) and can decrease lower than 2 if the PMUT device 100 is operating in water (e.g., acoustic coupling layer 114 is water).

Figure 3:
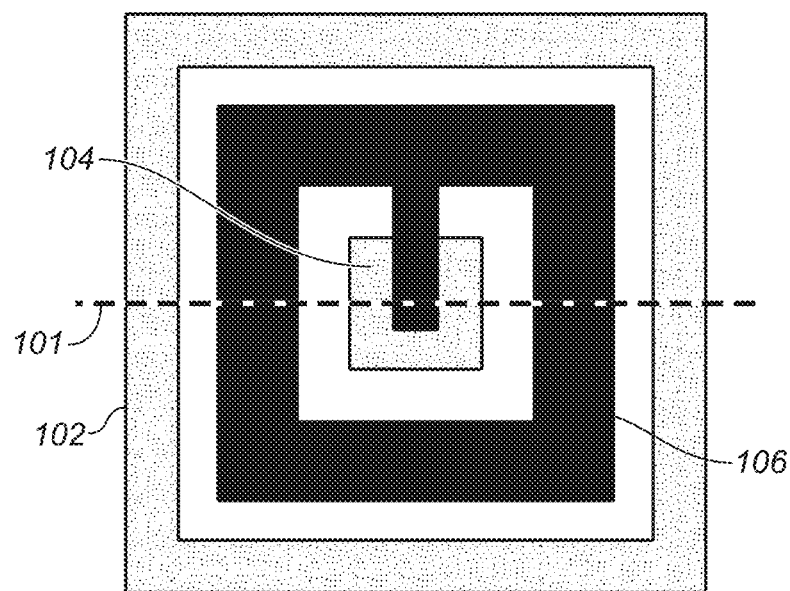
FIG. 3 is a top view of the PMUT device of FIG. 1, according to some embodiments.

FIG. 3 is a top view of the PMUT device 100 of FIG. 1 having a substantially square shape, which corresponds in part to a cross section along dotted line 101 in FIG. 3. Layout of surrounding edge support 102, interior support 104, and lower electrode 106 are illustrated, with other continuous layers not shown. It should be appreciated that the term "substantially" in "substantially square shape" is intended to convey that a PMUT device 100 is generally square-shaped, with allowances for variations due to manufacturing processes and tolerances, and that slight deviation from a square shape (e.g., rounded corners, slightly wavering lines, deviations from perfectly orthogonal corners or intersections, etc.) may be present in a manufactured device. While a generally square arrangement PMUT device is shown, alternative embodiments including rectangular, hexagon, octagonal, circular, or elliptical are contemplated. In other embodiments, more complex electrode or PMUT device shapes can be used, including irregular and non-symmetric layouts such as chevrons or pentagons for edge support and electrodes.

Figure 4:
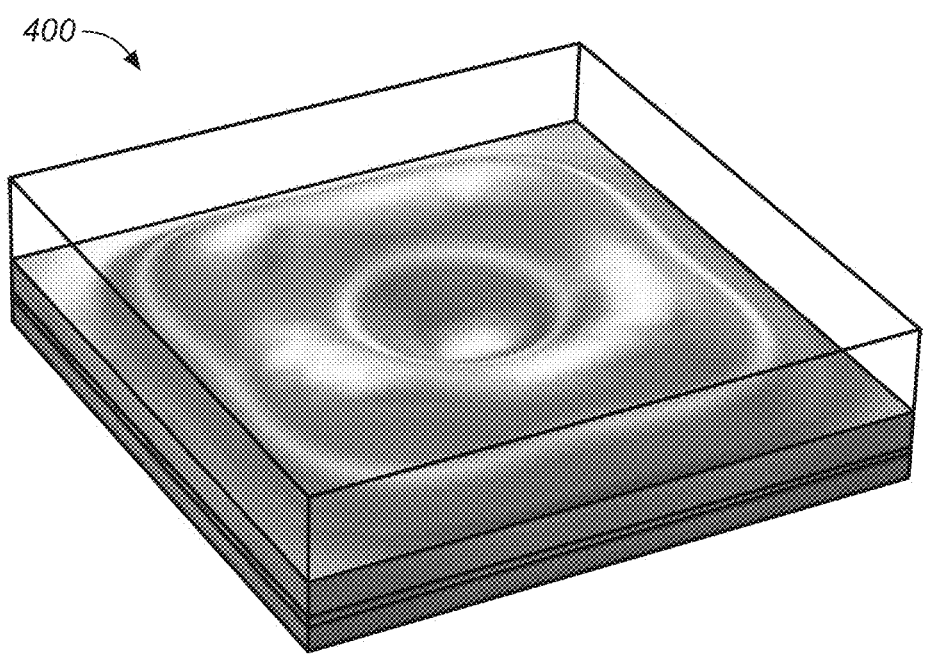
FIG. 4 is a simulated map illustrating maximum vertical displacement of the membrane of the PMUT device shown in FIGS. 1-3, according to some embodiments.

FIG. 4 is a simulated topographic map 400 illustrating maximum vertical displacement of the membrane 120 of the PMUT device 100 shown in FIGS. 1-3. As indicated, maximum displacement generally occurs along a center axis of the lower electrode, with corner regions having the greatest displacement. As with the other figures, FIG. 4 is not drawn to scale with the vertical displacement exaggerated for illustrative purposes, and the maximum vertical displacement is a fraction of the horizontal surface area comprising the PMUT device 100. In an example PMUT device 100, maximum vertical displacement may be measured in nanometers, while surface area of an individual PMUT device 100 may be measured in square microns.

Figure 5:
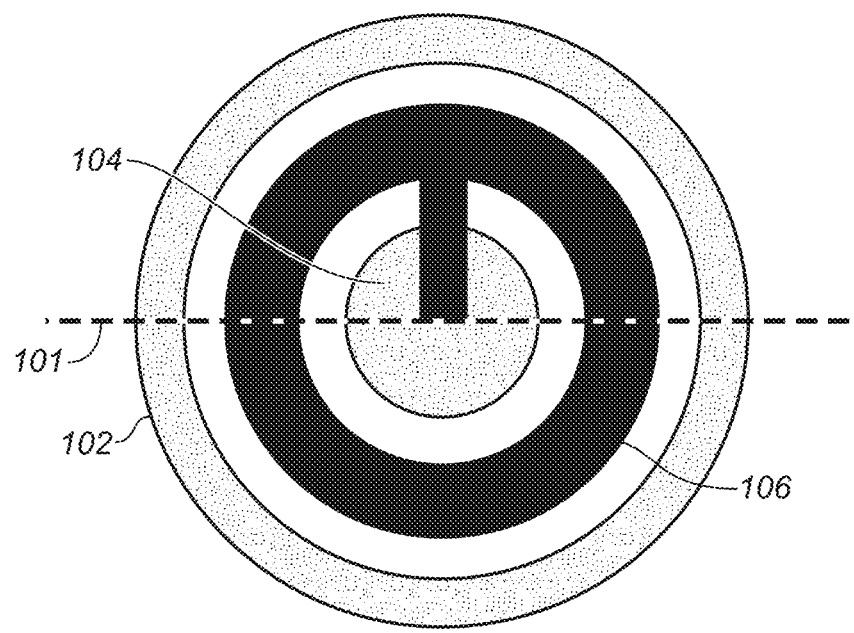
FIG. 5 is a top view of an example PMUT device having a circular shape, according to some embodiments.

FIG. 5 is a top view of another example of the PMUT device 100 of FIG. 1 having a substantially circular shape, which corresponds in part to a cross section along dotted line 101 in FIG. 5. Layout of surrounding edge support 102, interior support 104, and lower electrode 106 are illustrated, with other continuous layers not shown. It should be appreciated that the term "substantially" in "substantially circular shape" is intended to convey that a PMUT device 100 is generally circle-shaped, with allowances for variations due to manufacturing processes and tolerances, and that slight deviation from a circle shape (e.g., slight deviations on radial distance from center, etc.) may be present in a manufactured device.

Figure 6:
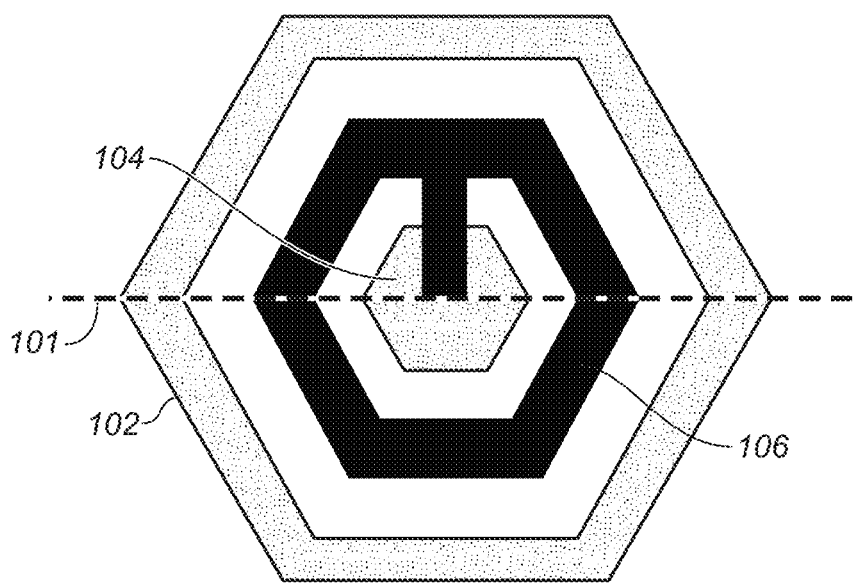
FIG. 6 is a top view of an example PMUT device having a hexagonal shape, according to some embodiments.

FIG. 6 is a top view of another example of the PMUT device 100 of FIG. 1 having a substantially hexagonal shape, which corresponds in part to a cross section along dotted line 101 in FIG. 6. Layout of surrounding edge support 102, interior support 104, and lower electrode 106 are illustrated, with other continuous layers not shown. It should be appreciated that the term "substantially" in "substantially hexagonal shape" is intended to convey that a PMUT device 100 is generally hexagon-shaped, with allowances for variations due to manufacturing processes and tolerances, and that slight deviation from a hexagon shape (e.g., rounded corners, slightly wavering lines, deviations from perfectly orthogonal corners or intersections, etc.) may be present in a manufactured device.

Figure 7:
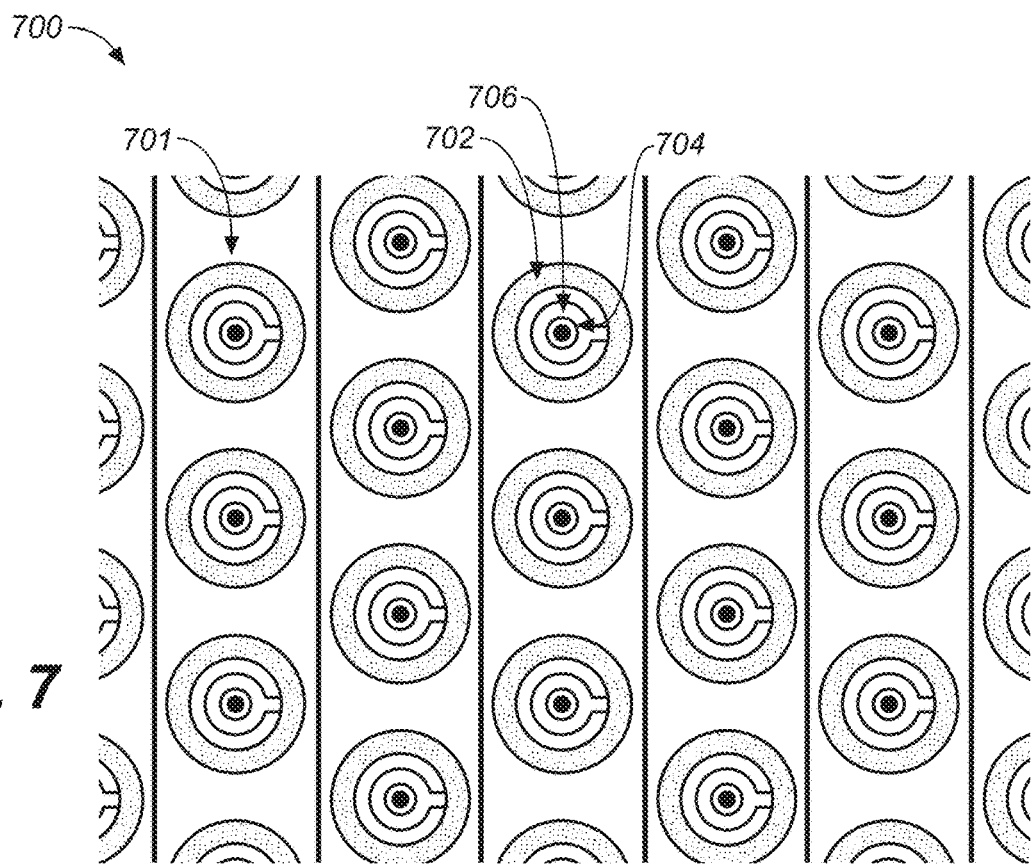
FIG. 7 illustrates an example array of circular-shaped PMUT devices, according to some embodiments.

FIG. 7 illustrates an example two-dimensional array 700 of circular-shaped PMUT devices 701 formed from PMUT devices having a substantially circular shape similar to that discussed in conjunction with FIGS. 1, 2 and 5. Layout of circular surrounding edge support 702, interior support 704, and annular or ring shaped lower electrode 706 surrounding the interior support 704 are illustrated, while other continuous layers are not shown for clarity. As illustrated, array 700 includes columns of circular-shaped PMUT devices 701 that are offset. It should be appreciated that the circular-shaped PMUT devices 701 may be closer together, such that edges of the columns of circular-shaped PMUT devices 701 overlap. Moreover, it should be appreciated that circular-shaped PMUT devices 701 may contact each other. In various embodiments, adjacent circular-shaped PMUT devices 701 are electrically isolated. In other embodiments, groups of adjacent circular-shaped PMUT devices 701 are electrically connected, where the groups of adjacent circular-shaped PMUT devices 701 are electrically isolated.

Figure 8:
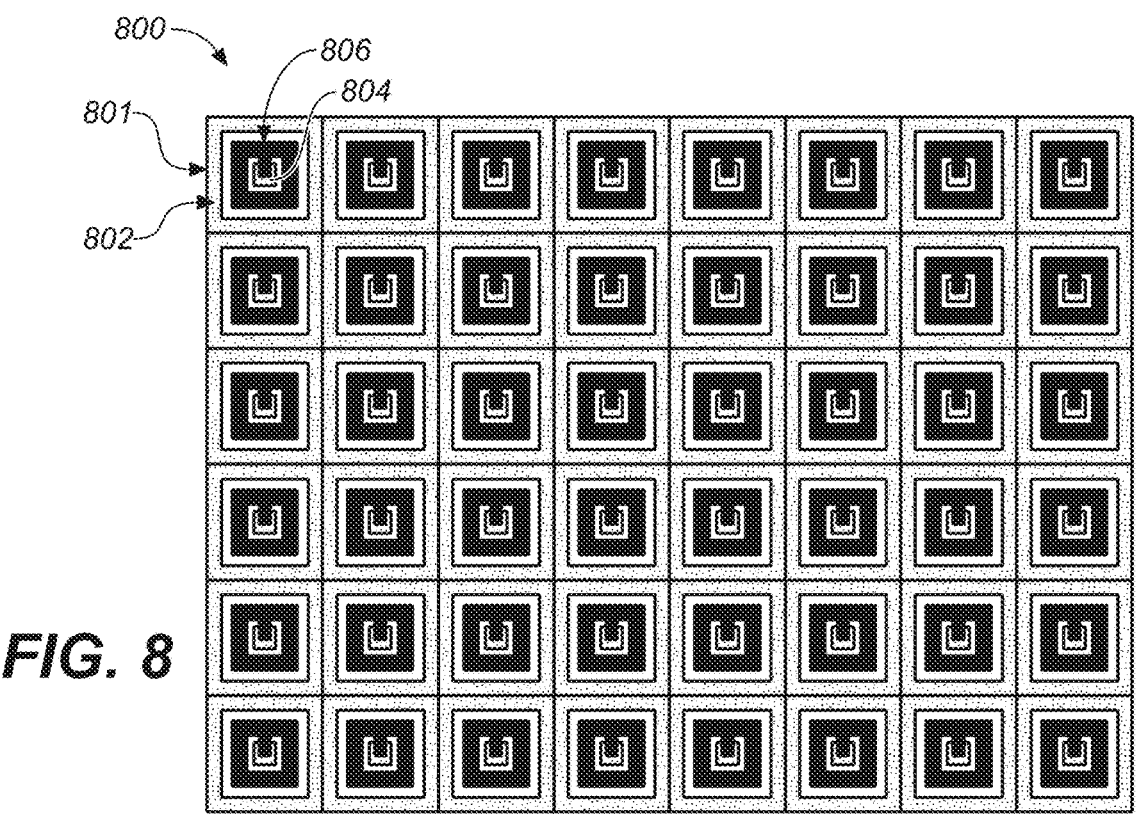
FIG. 8 illustrates an example array of square-shaped PMUT devices, according to some embodiments.

FIG. 8 illustrates an example two-dimensional array 800 of square-shaped PMUT devices 801 formed from PMUT devices having a substantially square shape similar to that discussed in conjunction with FIGS. 1, 2 and 3. Layout of square surrounding edge support 802, interior support 804, and square-shaped lower electrode 806 surrounding the interior support 804 are illustrated, while other continuous layers are not shown for clarity. As illustrated, array 800 includes columns of square-shaped PMUT devices 801 that are in rows and columns. It should be appreciated that rows or columns of the square-shaped PMUT devices 801 may be offset. Moreover, it should be appreciated that square-shaped PMUT devices 801 may contact each other or be spaced apart. In various embodiments, adjacent square-shaped PMUT devices 801 are electrically isolated. In other embodiments, groups of adjacent square-shaped PMUT devices 801 are electrically connected, where the groups of adjacent square-shaped PMUT devices 801 are electrically isolated.

Figure 9:
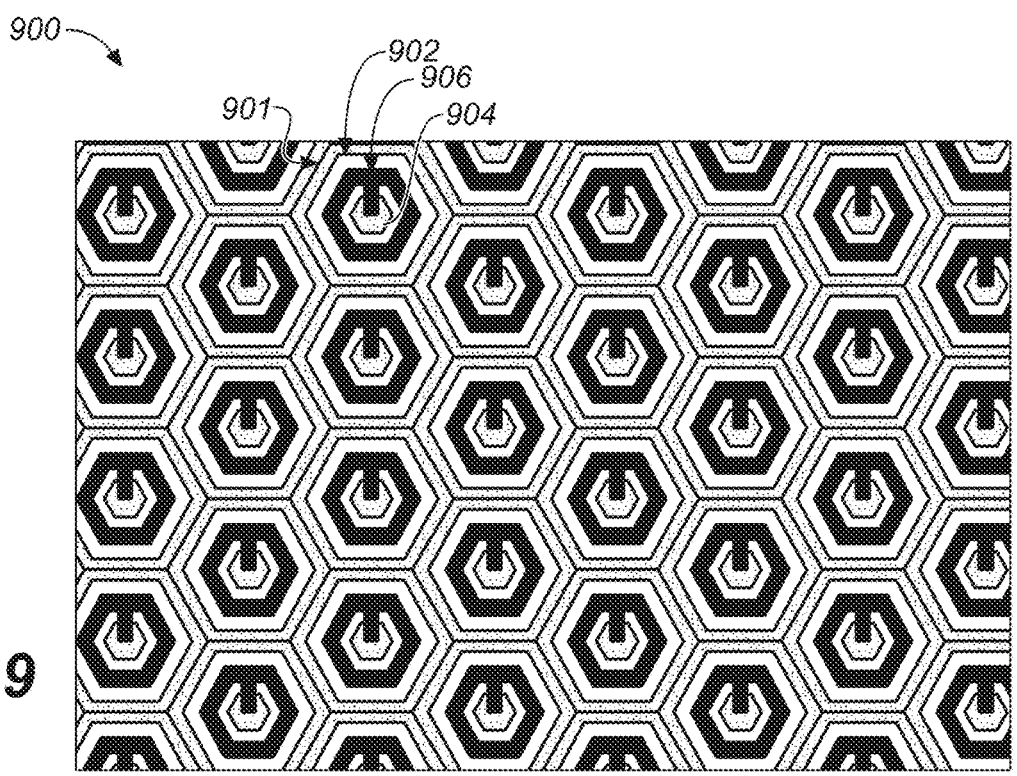
FIG. 9 illustrates an example array of hexagonal-shaped PMUT devices, according to some embodiments.

FIG. 9 illustrates an example two-dimensional array 900 of hexagon-shaped PMUT devices 901 formed from PMUT devices having a substantially hexagon shape similar to that discussed in conjunction with FIGS. 1, 2 and 6. Layout of hexagon-shaped surrounding edge support 902, interior support 904, and hexagon-shaped lower electrode 906 surrounding the interior support 904 are illustrated, while other continuous layers are not shown for clarity. It should be appreciated that rows or columns of the hexagon-shaped PMUT devices 901 may be offset. Moreover, it should be appreciated that hexagon-shaped PMUT devices 901 may contact each other or be spaced apart. In various embodiments, adjacent hexagon-shaped PMUT devices 901 are electrically isolated. In other embodiments, groups of adjacent hexagon-shaped PMUT devices 901 are electrically connected, where the groups of adjacent hexagon-shaped PMUT devices 901 are electrically isolated. While FIGS. 7, 8 and 9 illustrate example layouts of PMUT devices having different shapes, it should be appreciated that many different layouts are available. Moreover, in accordance with various embodiments, arrays of PMUT devices are included within a MEMS layer.

In operation, during transmission, selected sets of PMUT devices in the two-dimensional array can transmit an acoustic signal (e.g., a short ultrasonic pulse) and during sensing, the set of active PMUT devices in the two-dimensional array can detect an interference of the acoustic signal with an object (in the path of the acoustic wave). The received interference signal (e.g., generated based on reflections, echoes, etc. of the acoustic signal from the object) can then be analyzed. As an example, an image of the object, a distance of the object from the sensing component, a density of the object, a motion of the object, etc., can all be determined based on comparing a frequency and/or phase of the interference signal with a frequency and/or phase of the acoustic signal. Moreover, results generated can be further analyzed or presented to a user via a display device (not shown).

FIG. 10 illustrates a pair of example PMUT devices 1000 in a PMUT array, with each PMUT sharing at least one common edge support 1002. As illustrated, the PMUT devices have two sets of independent lower electrode labeled as 1006 and 1026. These differing electrode patterns enable antiphase operation of the PMUT devices 1000, and increase flexibility of device operation. In one embodiment, the pair of PMUTs may be identical, but the two electrodes could drive different parts of the same PMUT antiphase (one contracting, and one extending), such that the PMUT displacement becomes larger. While other continuous layers are not shown for clarity, each PMUT also includes an upper electrode (e.g., upper electrode 108 of FIG. 1). Accordingly, in various embodiments, a PMUT device may include at least three electrodes.

FIGS. 11A, 11B, 11C, and 11D illustrate alternative examples of interior support structures, in accordance with various embodiments. Interior supports structures may also be referred to as "pinning structures," as they operate to pin the membrane to the substrate. It should be appreciated that interior support structures may be positioned anywhere within a cavity of a PMUT device, and may have any type of shape (or variety of shapes), and that there may be more than one interior support structure within a PMUT device. While FIGS. 11A, 11B, 11C, and 11D illustrate alternative examples of interior support structures, it should be appreciated that these examples or for illustrative purposes, and are not intended to limit the number, position, or type of interior support structures of PMUT devices.

Figure 11A:
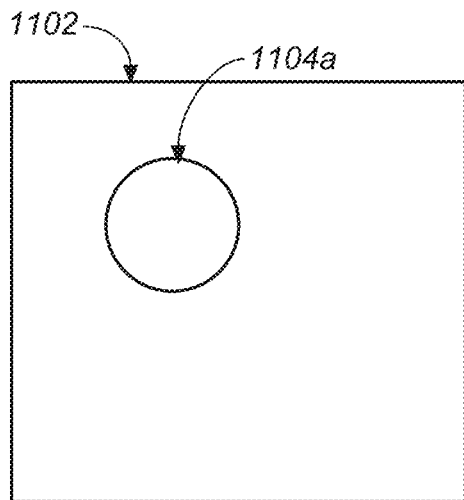
FIGS. 11A, 11B, 11C, and 11D illustrate alternative examples of interior support structures, according to various embodiments.
Figure 11B:
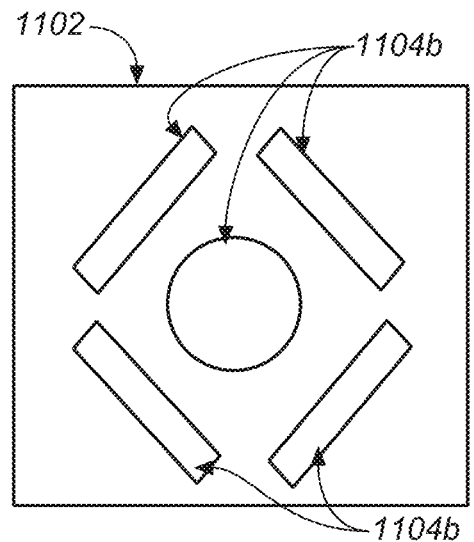
Figure 11C:
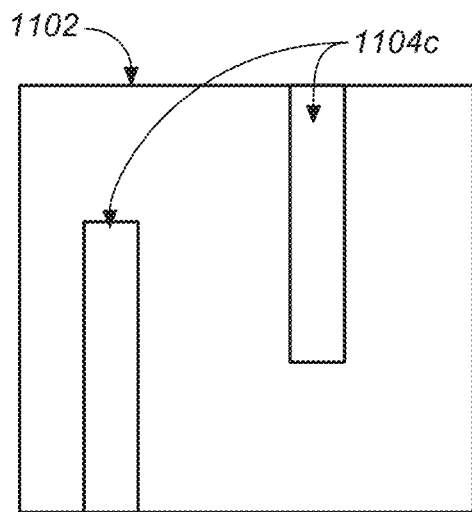
Figure 11D:
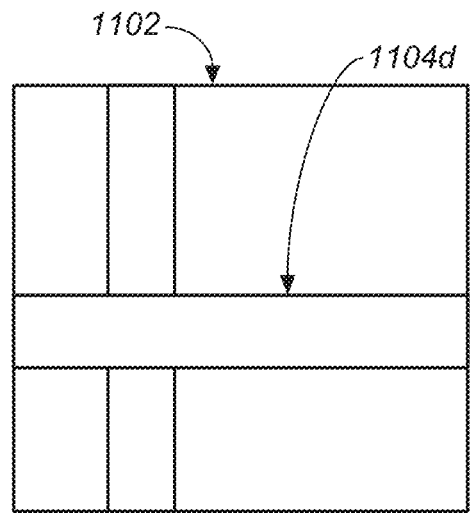

For example, interior supports structures do not have to be centrally located with a PMUT device area, but can be non-centrally positioned within the cavity. As illustrated in FIG. 11A, interior support 1104a is positioned in a non-central, off-axis position with respect to edge support 1102. In other embodiments such as seen in FIG. 11B, multiple interior supports 1104b can be used. In this embodiment, one interior support is centrally located with respect to edge support 1102, while the multiple, differently shaped and sized interior supports surround the centrally located support. In still other embodiments, such as seen with respect to FIGS. 11C and 11D, the interior supports (respectively 1104c and 1104d) can contact a common edge support 1102. In the embodiment illustrated in FIG. 11D, the interior supports 1104d can effectively divide the PMUT device into subpixels. This would allow, for example, activation of smaller areas to generate high frequency ultrasonic waves, and sensing a returning ultrasonic echo with larger areas of the PMUT device. It will be appreciated that the individual pinning structures can be combined into arrays.

Figure 12:
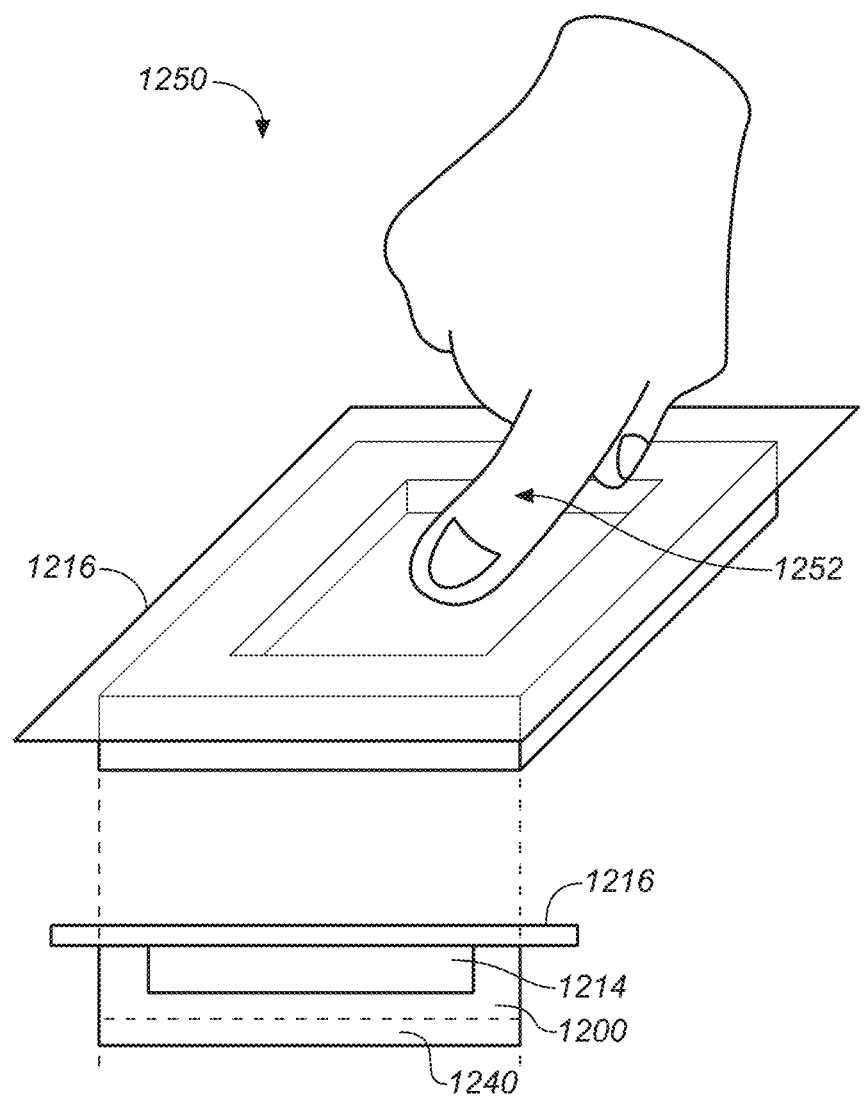
FIG. 12 illustrates a PMUT array used in an ultrasonic fingerprint sensing system, according to some embodiments.

FIG. 12 illustrates an embodiment of a PMUT array used in an ultrasonic fingerprint sensing system 1250. The fingerprint sensing system 1250 can include a platen 1216 onto which a human finger 1252 may make contact. Ultrasonic signals are generated and received by a PMUT device array 1200, and travel back and forth through acoustic coupling layer 1214 and platen 1216. Signal analysis is conducted using processing logic module 1240 (e.g., control logic) directly attached (via wafer bonding or other suitable techniques) to the PMUT device array 1200. It will be appreciated that the size of platen 1216 and the other elements illustrated in FIG. 12 may be much larger (e.g., the size of a handprint) or much smaller (e.g., just a fingertip) than as shown in the illustration, depending on the particular application.

In this example for fingerprinting applications, the human finger 1252 and the processing logic module 1240 can determine, based on a difference in interference of the acoustic signal with valleys and/or ridges of the skin on the finger, an image depicting epi-dermis and/or dermis layers of the finger. Further, the processing logic module 1240 can compare the image with a set of known fingerprint images to facilitate identification and/or authentication. Moreover, in one example, if a match (or substantial match) is found, the identity of user can be verified. In another example, if a match (or substantial match) is found, a command/operation can be performed based on an authorization rights assigned to the identified user. In yet another example, the identified user can be granted access to a physical location and/or network/computer resources (e.g., documents, files, applications, etc.)

In another example, for finger-based applications, the movement of the finger can be used for cursor tracking/movement applications. In such embodiments, a pointer or cursor on a display screen can be moved in response to finger movement. It is noted that processing logic module 1240 can include or be connected to one or more processors configured to confer at least in part the functionality of system 1250. To that end, the one or more processors can execute code instructions stored in memory, for example, volatile memory and/or nonvolatile memory.

Figure 13:
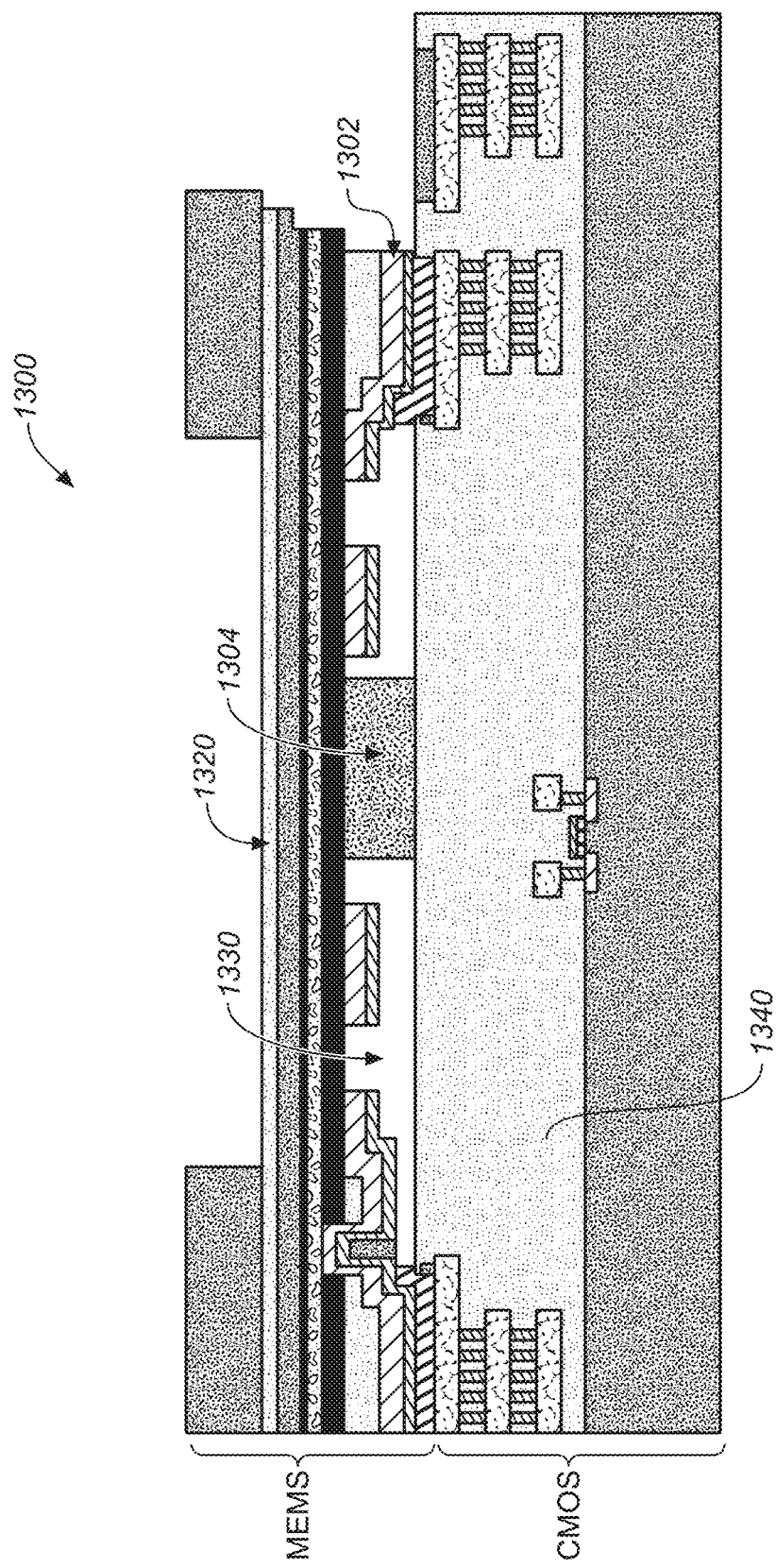
FIG. 13 illustrates an integrated fingerprint sensor formed by wafer bonding a CMOS logic wafer and a microelectromechanical (MEMS) wafer defining PMUT devices, according to some embodiments.

FIG. 13 illustrates an integrated fingerprint sensor 1300 formed by wafer bonding a CMOS logic wafer and a MEMS wafer defining PMUT devices, according to some embodiments. FIG. 13 illustrates in partial cross section one embodiment of an integrated fingerprint sensor formed by wafer bonding a substrate 1340 CMOS logic wafer and a MEMS wafer defining PMUT devices having a common edge support 1302 and separate interior support 1304. For example, the MEMS wafer may be bonded to the CMOS logic wafer using aluminum and germanium eutectic alloys, as described in U.S. Pat. No. 7,442,570. PMUT device 1300 has an interior pinned membrane 1320 formed over a cavity 1330. The membrane 1320 is attached both to a surrounding edge support 1302 and interior support 1304. The membrane 1320 is formed from multiple layers.

Example Operation of a Two-Dimensional Array of Ultrasonic Transducers

Systems and methods disclosed herein, in one or more aspects provide for the operation of a two-dimensional array of ultrasonic transducers (e.g., an array of piezoelectric actuated transducers or PMUTs). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

Figure 14:
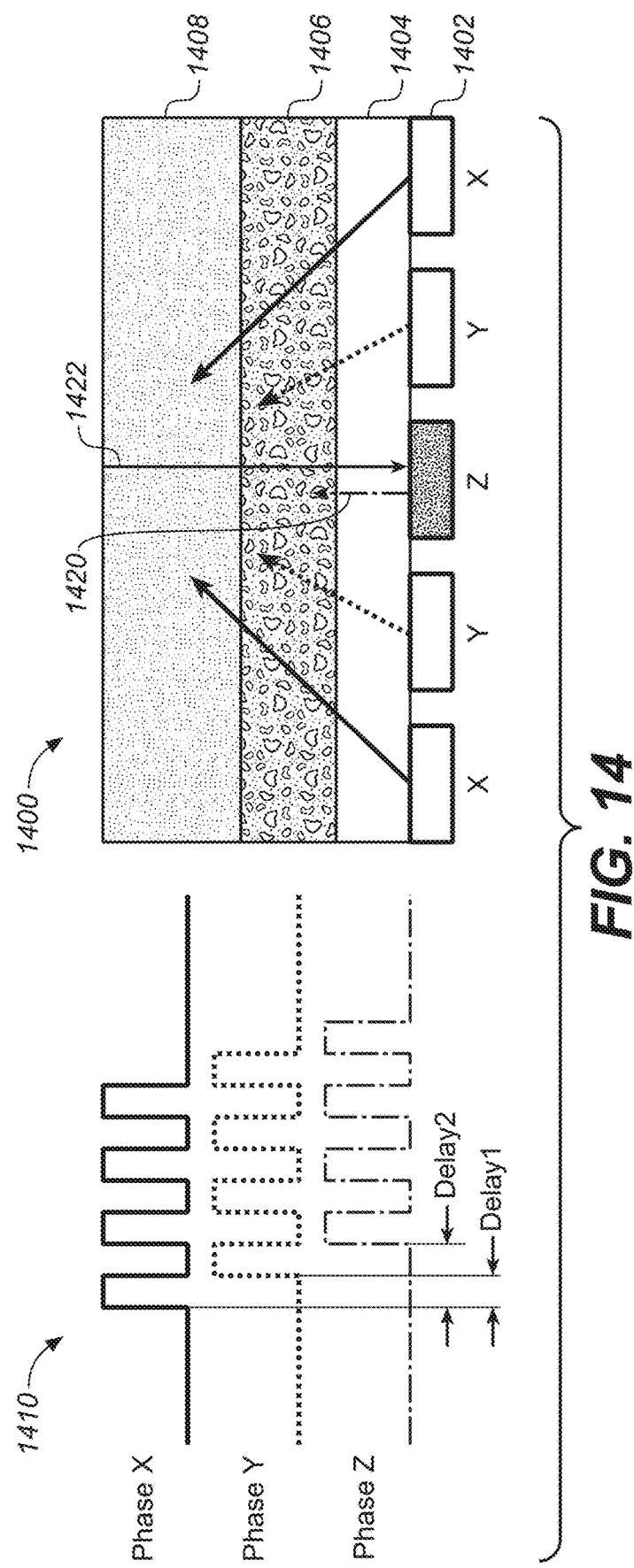
FIG. 14 illustrates an example ultrasonic transducer system with phase delayed transmission, according to some embodiments.

FIG. 14 illustrates an example ultrasonic transducer system 1400 with phase delayed transmission, according to some embodiments. As illustrated, FIG. 14 shows ultrasonic beam transmission and reception using a one-dimensional, five-element, ultrasonic transducer system 1400 having phase delayed inputs 1410. In various embodiments, ultrasonic transducer system 1400 is comprised of PMUT devices having a center pinned membrane (e.g., PMUT device 100 of FIG. 1).

As illustrated, ultrasonic transducer system 1400 includes five ultrasonic transducers 1402 including a piezoelectric material and activating electrodes that are covered with a continuous stiffening layer 1404 (e.g., a mechanical support layer). Stiffening layer 1404 contacts acoustic coupling layer 1406, and in turn is covered by a platen layer 1408. In various embodiments, the stiffening layer 1404 can be silicon, and the platen layer 1408 formed from glass, sapphire, or polycarbonate or similar durable plastic. The intermediately positioned acoustic coupling layer 1406 can be formed from a plastic, epoxy, or gel such as polydimethylsiloxane (PDMS) or other material. In one embodiment, the material of acoustic coupling layer 1406 has an acoustic impedance selected to be between the acoustic impedance of layers 1404 and 1408. In one embodiment, the material of acoustic coupling layer 1406 has an acoustic impedance selected to be close the acoustic impedance of platen layer 1408, to reduce unwanted acoustic reflections and improve ultrasonic beam transmission and sensing. However, alternative material stacks to the one shown in FIG. 14 may be used and certain layers may be omitted, provided the medium through which transmission occurs passes signals in a predictable way.

In operation, and as illustrated in FIG. 14, the ultrasonic transducers 1402 labelled with an "x" are triggered to emit ultrasonic waves at an initial time. At a second time, (e.g., 1-100 nanoseconds later), the ultrasonic transducers 1402 labelled with a "y" are triggered. At a third time (e.g., 1-100 nanoseconds after the second time) the ultrasonic transducer 1402 labelled with a "z" is triggered. The ultrasonic waves interfere transmitted at different times cause interference with each other, effectively resulting in a single high intensity beam 1420 that exits the platen layer 1408, contacts objects, such as a finger (not shown), that contact the platen layer 1408, and is in part reflected back to the ultrasonic transducers. In one embodiment, the ultrasonic transducers 1402 are switched from a transmission mode to a reception mode, allowing the "z" ultrasonic transducer to detect any reflected signals 1422. In other words, the phase delay pattern of the ultrasonic transducers 1402 is symmetric about the focal point where high intensity beam 1420 exits platen layer 1408.

It should be appreciated that an ultrasonic transducer 1402 of ultrasonic transducer system 1400 may be used to transmit and/or receive an ultrasonic signal, and that the illustrated embodiment is a non-limiting example. The received signal (e.g., generated based on reflections, echoes, etc. of the acoustic signal from an object contacting or near the platen layer 1408) can then be analyzed. As an example, an image of the object, a distance of the object from the sensing component, acoustic impedance of the object, a motion of the object, etc., can all be determined based on comparing a frequency, amplitude, phase and/or arrival time of the received signal with a frequency, amplitude, phase and/or transmission time of the transmitted acoustic signal. Moreover, results generated can be further analyzed or presented to a user via a display device (not shown).

Figure 15:
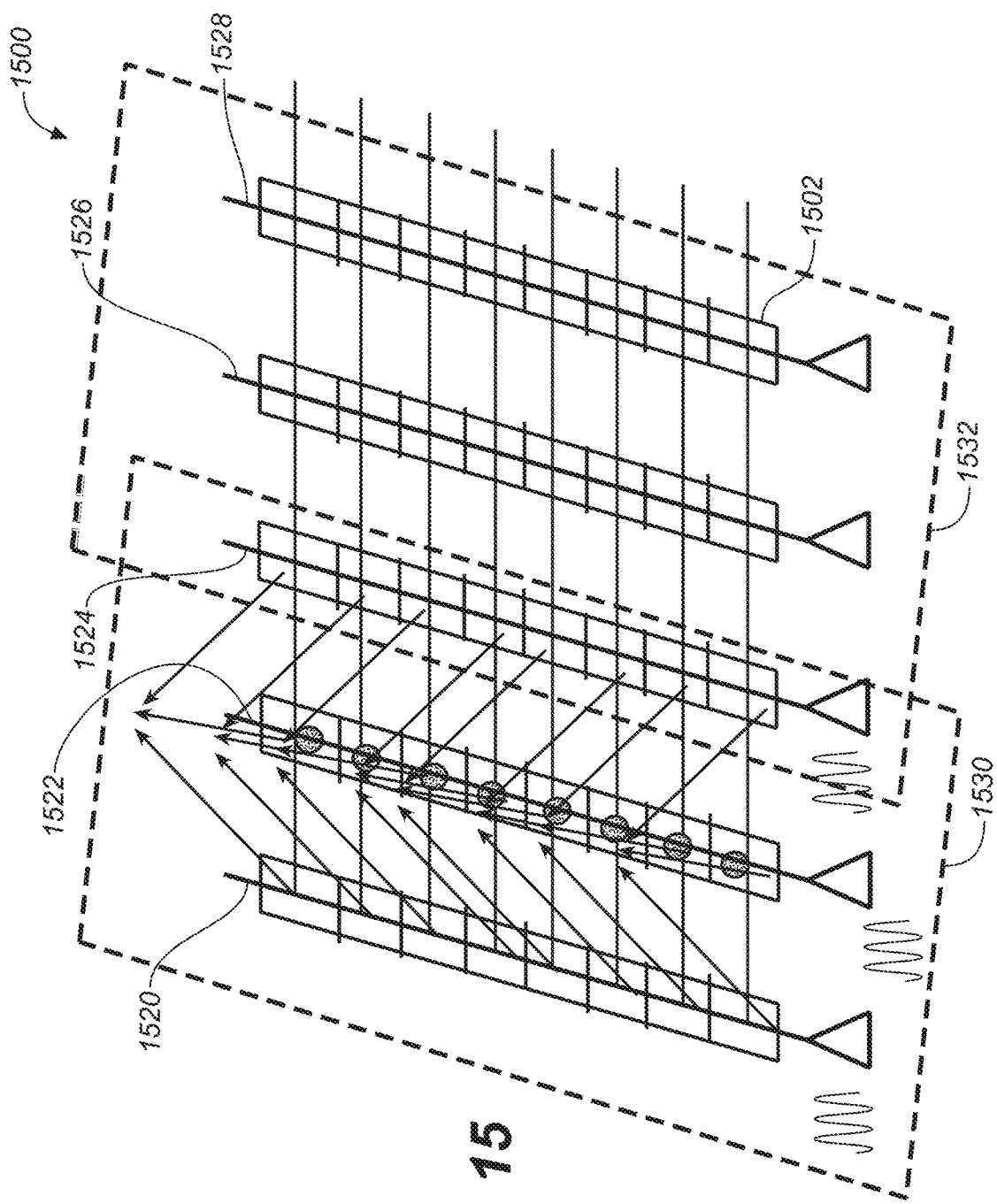
FIG. 15 illustrates another example ultrasonic transducer system with phase delayed transmission, according to some embodiments.

FIG. 15 illustrates another example ultrasonic transducer system 1500 with phase delayed transmission, according to some embodiments. As illustrated, FIG. 15 shows ultrasonic beam transmission and reception using a virtual block of two-dimensional, 24-element, ultrasonic transducers that form a subset of a 40-element ultrasonic transducer system 1500 having phase delayed inputs. In operation, an array position 1530 (represented by the dotted line), also referred to herein as a virtual block, includes columns 1520, 1522 and 1524 of ultrasonic transducers 1502. At an initial time, columns 1520 and 1524 of array position 1530 are triggered to emit ultrasonic waves at an initial time. At a second time (e.g., several nanoseconds later), column 1522 of array position 1530 is triggered. The ultrasonic waves interfere with each other, substantially resulting in emission of a high intensity ultrasonic wave centered on column 1522. In one embodiment, the ultrasonic transducers 1502 in columns 1520 and 1524 are switched off, while column 1522 is switched from a transmission mode to a reception mode, allowing detection of any reflected signals.

In one embodiment, after the activation of ultrasonic transducers 1502 of array position 1530, ultrasonic transducers 1502 of another array position 1532, comprised of columns 1524, 1526, and 1528 of ultrasonic transducers 1502 are triggered in a manner similar to that described in the foregoing description of array position 1530. In one embodiment, ultrasonic transducers 1502 of another array position 1532 are activated after a detection of a reflected ultrasonic signal at column 1522 of array position 1530. It should be appreciated that while movement of the array position by two columns of ultrasonic transducers is illustrated, movement by one, three, or more columns rightward or leftward is contemplated, as is movement by one or more rows, or by movement by both some determined number of rows and columns. In various embodiments, successive array positions can be either overlapping in part, or can be distinct. In some embodiments the size of array positions can be varied. In various embodiments, the number of ultrasonic transducers 1502 of an array position for emitting ultrasonic waves can be larger than the number of ultrasonic transducers 1502 of an array position for ultrasonic reception. In still other embodiments, array positions can be square, rectangular, ellipsoidal, circular, or more complex shapes such as crosses.

Example ultrasonic transducer system 1500 is operable to beamform a line of a high intensity ultrasonic wave centered over column 1522. It should be appreciated that the principles illustrated in FIG. 15 for beamforming a line using columns of ultrasonic transducers is applicable to embodiments for beamforming a point using ultrasonic transducers, as will be explained below. For instance, example ultrasonic transducer system 1500 includes columns of ultrasonic transducers in which the ultrasonic transducers of each column are jointly operated to activate at the same time, operating to beamform along a line. It should be appreciated that the ultrasonic transducers of a two-dimensional array may be independently operable, and used for beamform points as well, as will be described below.

Figures 16, 17:
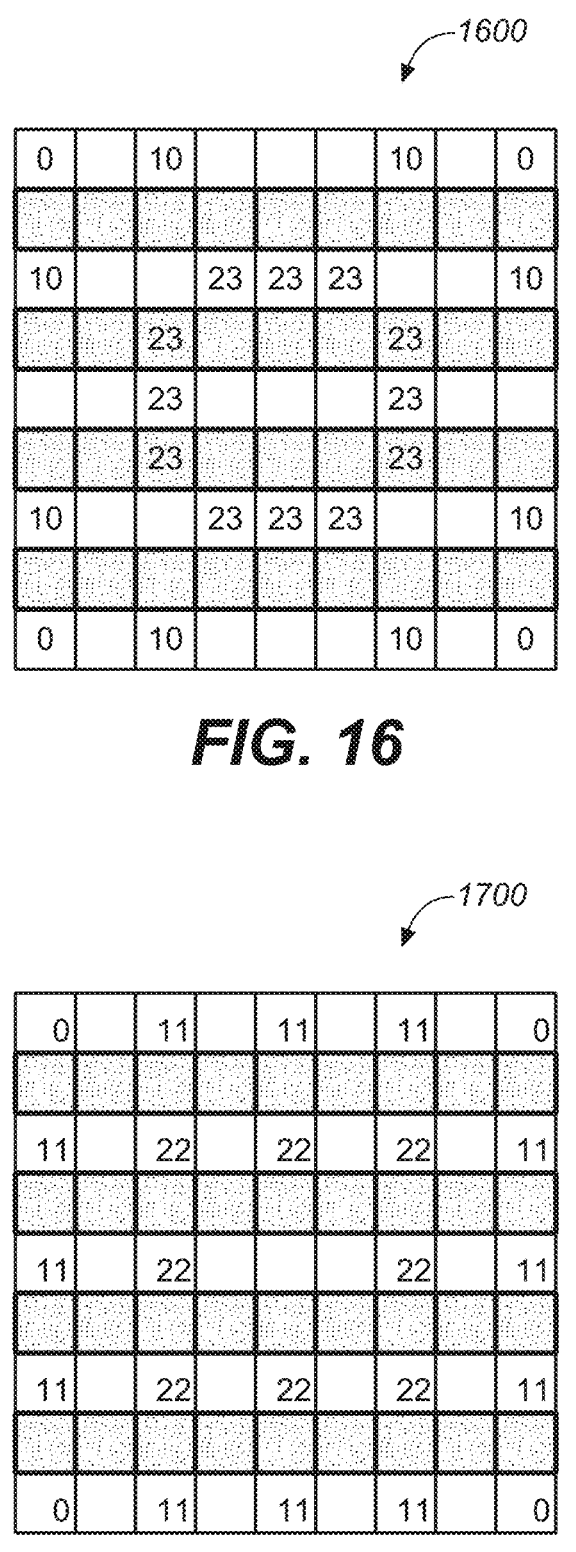

FIG. 16 illustrates an example phase delay pattern for ultrasonic signal transmission of a 9×9 ultrasonic transducer block 1600 of a two-dimensional array of ultrasonic transducers, according to some embodiments. As illustrated in FIG. 16, each number in the ultrasonic transducer array is equivalent to the nanosecond delay used during operation, and an empty element (e.g., no number) in the ultrasonic transducer block 1600 means that an ultrasonic transducer is not activated for signal transmission during operation. In various embodiments, ultrasonic wave amplitude can be the same or similar for each activated ultrasonic transducer, or can be selectively increased or decreased relative to other ultrasonic transducers. In the illustrated pattern, initial ultrasonic transducer activation is limited to corners of ultrasonic transducer block 1600, followed 10 nanoseconds later by a rough ring around the edges of ultrasonic transducer block 1600. After 23 nanoseconds, an interior ring of ultrasonic transducers is activated. Together, the twenty-four activated ultrasonic transducers generate an ultrasonic beam centered on the ultrasonic transducer block 1600. In other words, the phase delay pattern of ultrasonic transducer block 1600 is symmetric about the focal point where a high intensity beam contacts an object.

It should be appreciated that different ultrasonic transducers of ultrasonic transducer block 1600 may be activated for receipt of reflected ultrasonic signals. For example, the center 3×3 ultrasonic transducers of ultrasonic transducer block 1600 may be activated to receive the reflected ultrasonic signals. In another example, the ultrasonic transducers used to transmit the ultrasonic signal are also used to receive the reflected ultrasonic signal. In another example, the ultrasonic transducers used to receive the reflected ultrasonic signals include at least one of the ultrasonic transducers also used to transmit the ultrasonic signals.

FIG. 17 illustrates another example phase delay pattern for a 9×9 ultrasonic transducer block 1700, according to some embodiments. As illustrated in FIG. 17, the example phase delay pattern utilizes equidistant spacing of transmitting ultrasonic transducers. As illustrated in FIG. 16, each number in the ultrasonic transducer array is equivalent to the nanosecond delay used during operation, and an empty element (e.g., no number) in the ultrasonic transducer block 1700 means that an ultrasonic transducer is not activated for signal transmission during operation. In the illustrated embodiment, the initial ultrasonic transducer activation is limited to corners of ultrasonic transducer block 1700, followed 11 nanoseconds later by a rough ring around the edges of ultrasonic transducer block 1700. After 22 nanoseconds, an interior ring of ultrasonic transducers is activated. The illustrated embodiment utilizes equidistant spacing of the transmitting ultrasonic transducers to reduce issues with crosstalk and heating, wherein each activated ultrasonic transducers is surrounded by un-activated ultrasonic transducers. Together, the twenty-four activated ultrasonic transducers generate an ultrasonic beam centered on the ultrasonic transducer block 1700.

Figure 18:
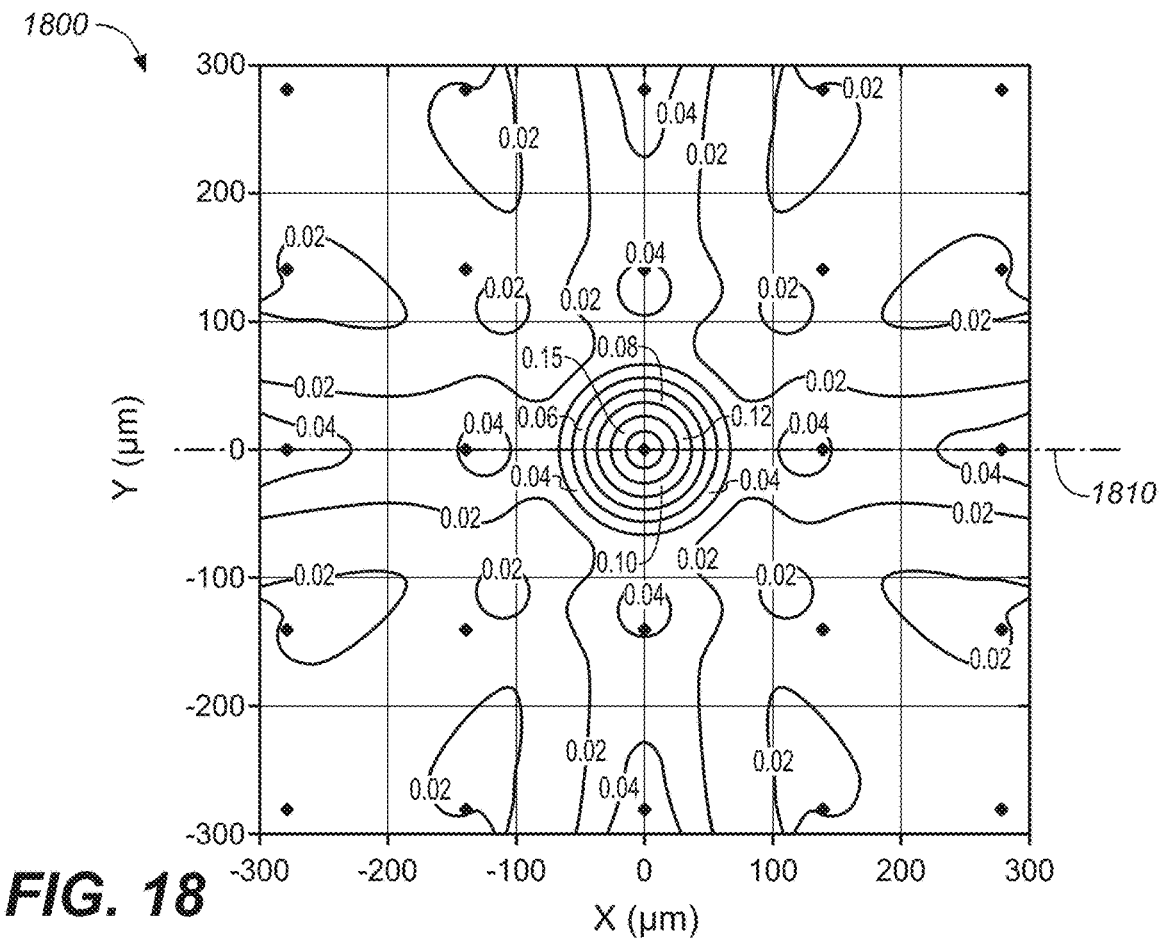
FIG. 18 illustrates a plan view of simulated ultrasonic pressure on the focal plane for an example ultrasonic transducer system using three timing phases, according to an embodiment.

FIG. 18 illustrates a plan view 1800 of simulated ultrasonic pressure on the focal plane for an example ultrasonic transducer system using three timing phases, according to an embodiment. FIG. 18 is a graphical illustration of simulated ultrasonic intensity for a three-phase system such as discussed with respect to FIG. 17. In this embodiment, the contour lines illustrate creation of a high intensity centrally located beam capable of directing an approximately ~50 to 100 um spot at a platen layer. The illustrated beam linearly adds the energy from all 24 actuated ultrasonic transducers and has a 3 dB beam width of 73 um.

Figure 19:
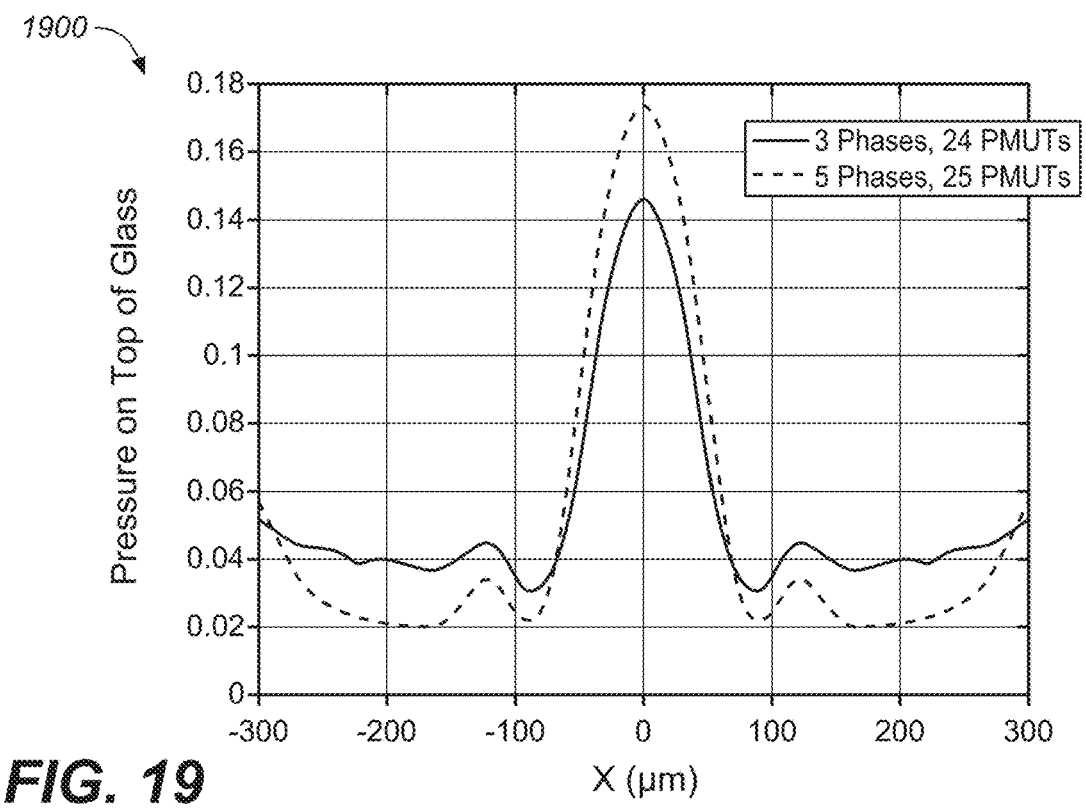
FIG. 19 illustrates a cross section of simulated ultrasonic pressure on the focal plane for an example ultrasonic transducer system using either three or five timing phases, according to an embodiment.

FIG. 19 illustrates a cross section 1900 of simulated ultrasonic pressure on the focal plane for an example ultrasonic transducer system using either three or five timing phases, according to an embodiment. FIG. 19 is a graphical illustration of a cross section 1900 at line 1810 of FIG. 18 of the simulated ultrasonic intensity for a three-phase system such as discussed with respect to FIG. 17. Also shown in FIG. 19 is an example of the concentrated beam formed using five timing phases and twenty-five actuated ultrasonic transducer, which illustrates nominally better performance but at increased complexity.

FIGS. 20A-C illustrate example transmitter blocks and receiver blocks for an array position in a two-dimensional array 2000 of ultrasonic transducers, according to some embodiments. In FIG. 20A, a four phase (indicated using different hatch patterns) activated phase delay pattern of ultrasonic transducers in a 9×9 array position 2010 is used to generate an ultrasonic beam. Example receiver patterns are also illustrated, with receive pattern 2020 being ultrasonic transducers in a 5×5 square and receive pattern 2022 being a more complex cross shaped block.

In FIG. 20B, the 9×9 array position 2012 is moved rightward by a single column 2032 relative to array position 2010 of FIG. 20A, as indicated by the arrow. In other words, after activation at array position 2010 of two-dimensional array 2000, array position 2012 of two-dimensional array 2000 is activated, effectively sensing a pixel to the right of two-dimensional array 2000. In such a manner, multiple pixels associated with multiple array positions of the two-dimensional array 2000 can be sensed. Similarly, in FIG. 20C the 9×9 array position 2014 is moved downward by a single row 2034 relative to array position 2010 of FIG. 20A after activation of array position 2010 of two-dimensional array 2000, as indicated by the arrow. It should be appreciated that the 9×9 array position can move to different positions of two-dimensional array 2000 in any sequence. For example, an activation sequence may be defined as left to right for a row of ultrasonic transducers, then moving down one row when the end of a row is reached, and continuing to proceed in this manner until a desired number of pixels are sensed. In another example, the activation sequence may be defined as top to bottom for a column, and moving to another column once enough pixels have been sensed for a column. It should be appreciated that any activation sequence may be defined without limitation, including a random activation sequence. Moreover, it should be appreciated that any number of columns and/or rows can be skipped depending on a desired resolution.

In various embodiments, as an array position approaches an edge of two-dimensional array 2000, only those ultrasonic transducers that are available in two-dimensional array 2000 are activated. In other words, where a beam is being formed at a center of an array position, but the center is near or adjacent an edge of two-dimensional array 2000 such that at least one ultrasonic transducer of a phase delay pattern is not available (as the array position extends over an edge), then only those ultrasonic transducers that are available in two-dimensional array 2000 are activated. In various embodiments, the ultrasonic transducers that are not available (e.g., outside the edge of two-dimensional array 2000) are truncated from the activation pattern. For example, for a 9×9 ultrasonic transducer block, as the center ultrasonic transducer moves towards the edge such that the 9×9 ultrasonic transducer block extends over the edge of the two-dimensional array, rows, columns, or rows and columns (in the instance of corners) of ultrasonic transducers are truncated from the 9×9 ultrasonic transducer block. For instance, a 9×9 ultrasonic transducer block effectively becomes a 5×9 ultrasonic transducer block when the center ultrasonic transducer is along an edge of the two-dimensional array. Similarly, a 9×9 ultrasonic transducer block effectively becomes a 6×9 ultrasonic transducer block when the center ultrasonic transducer is one row or column from an edge of the two-dimensional array. In other embodiments, as an array position approaches an edge of two-dimensional array 2000, the beam is steered by using phase delay patterns that are asymmetric about the focal point, as described below in accordance with FIGS. 21 through 25B.

Figure 21:
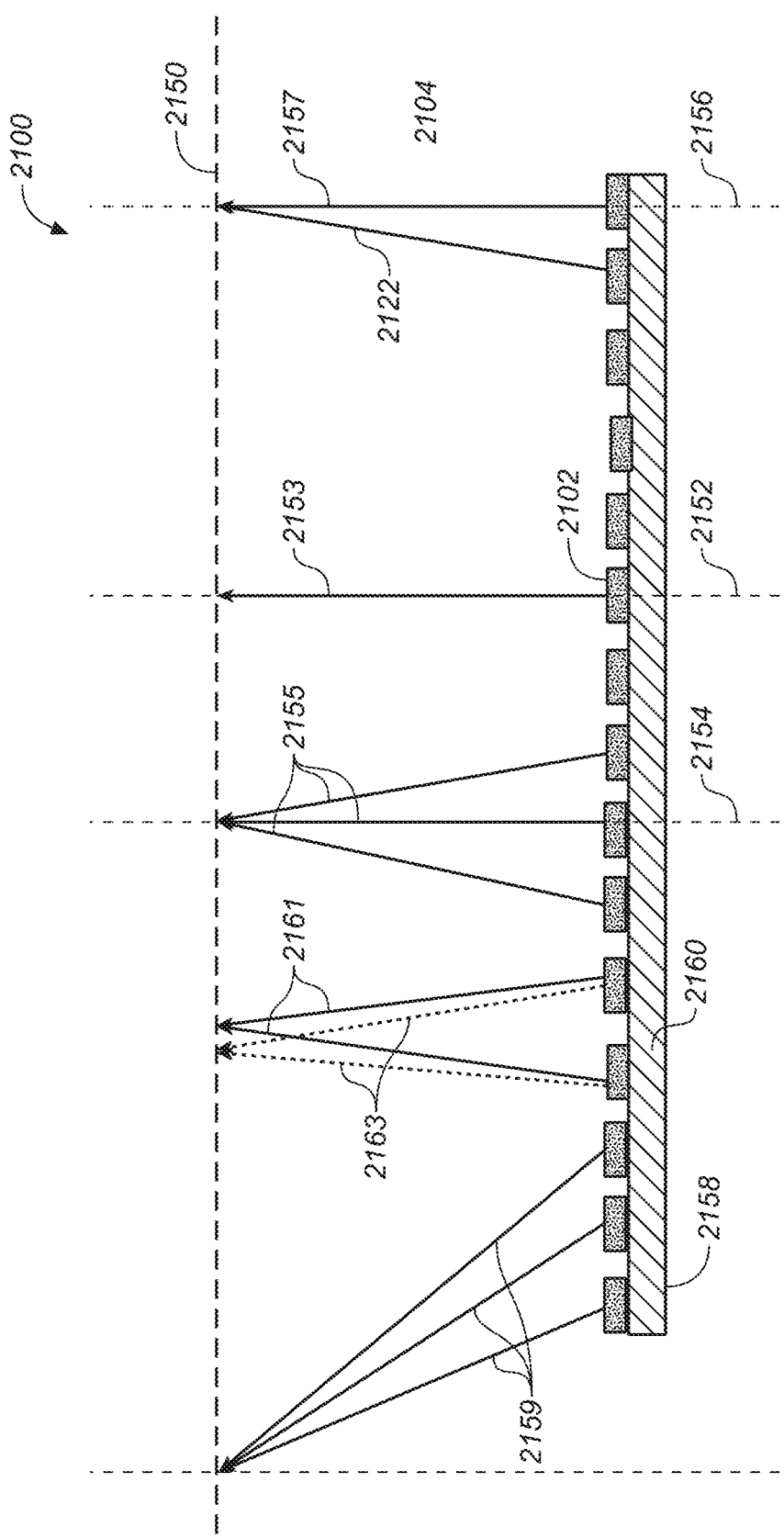
FIG. 21 illustrates an example ultrasonic transducer system with phase delayed transmission, according to some embodiments.

FIG. 21 illustrates an example ultrasonic transducer system 2100 with phase delayed transmission, according to some embodiments. FIG. 21 shows five different modes of ultrasonic beam transmission using an example one-dimensional, fifteen-element, ultrasonic transducer system 2100 having phase delayed inputs. As illustrated, ultrasonic transducers 2102 can be operated in various modes to provide ultrasonic beam spots focused along line 2150 (e.g., a top of a platen layer). In a first mode, a single ultrasonic transducer 2152 is operated to provide a single broad ultrasonic beam having a peak amplitude centered on arrow 2153. In a second mode, multiple ultrasonic transducers in a symmetrical pattern 2154 about the center ultrasonic transducer are sequentially triggered to emit ultrasonic waves at differing initial times. As illustrated, a center located transducer is triggered at a delayed time with respect to surrounding transducers (which are triggered simultaneously). The ultrasonic waves interfere with each other, resulting in a single high intensity beam 2155. In a third mode, for ultrasonic transducers 2156 located adjacent to or near an edge of the ultrasonic transducer system 2100, an asymmetrical triggering pattern can be used to produce beam 2157. In a fourth mode, asymmetrical triggering patterns for transducers 2158 can be used to steer an ultrasound beam to an off-center location 2159. A shown, the focused beam 2159 can be directed to a point above and outside boundaries of the ultrasonic transducer system 2100. In a fifth mode, the beam can be steered to focus at a series of discrete positions, with the beam spacing having a pitch less than, equal to, or greater than a pitch of the ultrasonic transducers. In FIG. 21, transducers 2160 are triggered at separate times to produce beam spots separated by a pitch less than that of the ultrasonic transducers (indicated respectively by solid lines directed to form beam spot 2161 and dotted lines to form beam spot 2163).

Figure 22:
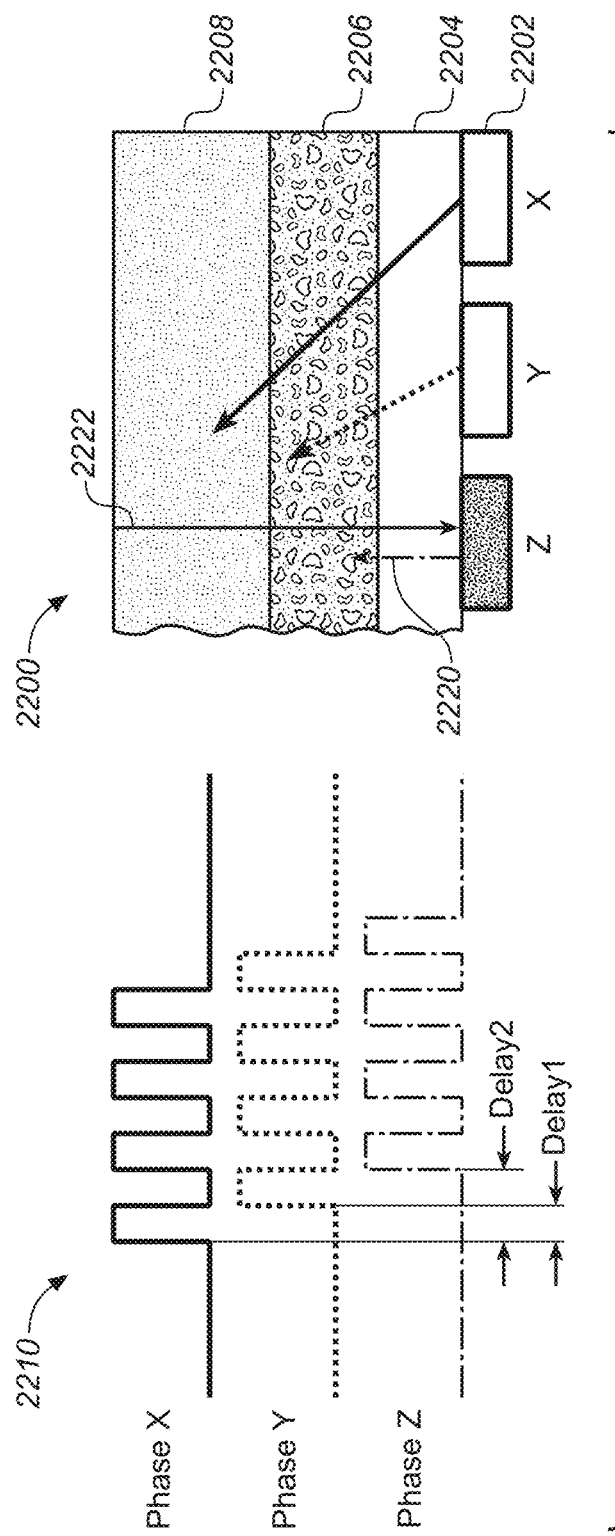
FIG. 22 illustrates an example ultrasonic transducer system with phase delayed transmission, according to some embodiments.

FIG. 22 illustrates an example ultrasonic transducer system 2200 with phase delayed transmission, according to some embodiments. As illustrated, FIG. 22 shows ultrasonic beam transmission and reception using a one-dimensional, three-element, ultrasonic transducer system 2200 having phase delayed inputs 2210. In various embodiments, ultrasonic transducer system 2200 is comprised of PMUT devices having a center pinned membrane (e.g., PMUT device 100 of FIG. 1).

As illustrated, ultrasonic transducer system 2200 includes three ultrasonic transducers 2202 including a piezoelectric material and activating electrodes that are covered with a continuous stiffening layer 2204 (e.g., a mechanical support layer). Stiffening layer 2204 contacts acoustic coupling layer 2206, and in turn is covered by a platen layer 2208. In various embodiments, the stiffening layer 2204 can be silicon, and the platen layer 2208 formed from glass, sapphire, or polycarbonate or similar durable plastic. The intermediately positioned acoustic coupling layer 2206 can be formed from a plastic or gel such as PDMS or other material. In one embodiment, the material of acoustic coupling layer 2206 has an acoustic impedance selected to be between the acoustic impedance of layers 2204 and 2208. In one embodiment, the material of acoustic coupling layer 2206 has an acoustic impedance selected to be close the acoustic impedance of platen layer 2208, to reduce unwanted acoustic reflections and improve ultrasonic beam transmission and sensing. However, alternative material stacks to the one shown in FIG. 22 may be used and certain layers may be omitted, provided the medium through which transmission occurs passes signals in a predictable way.

In operation, and as illustrated in FIG. 22, the ultrasonic transducer 2202 labelled with an "x" is triggered to emit ultrasonic waves at an initial time. At a second time, (e.g., 1-100 nanoseconds later), the ultrasonic transducer 2202 labelled with a "y" is triggered. At a third time (e.g., 1-100 nanoseconds after the second time) the ultrasonic transducer 2202 labelled with a "z" is triggered. The ultrasonic waves interfere transmitted at different times cause interference with each other, effectively resulting in a single high intensity beam 2220 that exits the platen layer 2208, contacts objects, such as a finger (not shown), that contact the platen layer 2208, and is in part reflected back to the ultrasonic transducers 2202. In one embodiment, the ultrasonic transducers 2202 are switched from a transmission mode to a reception mode, allowing the "z" ultrasonic transducer to detect any reflected signals. In other words, the phase delay pattern of the ultrasonic transducers 2202 is asymmetric about the focal point where high intensity beam 2220 exits platen layer 2208.

It should be appreciated that an ultrasonic transducer 2202 of ultrasonic transducer system 2200 may be used to transmit and/or receive an ultrasonic signal, and that the illustrated embodiment is a non-limiting example. The received signal (e.g., generated based on reflections, echoes, etc. of the acoustic signal from an object contacting or near the platen layer 2208) can then be analyzed. As an example, an image of the object, a distance of the object from the sensing component, an acoustic impedance of the object, a motion of the object, etc., can all be determined based on comparing a frequency, amplitude and/or phase of the received interference signal with a frequency, amplitude and/or phase of the transmitted acoustic signal. Moreover, results generated can be further analyzed or presented to a user via a display device (not shown).

Figure 23:
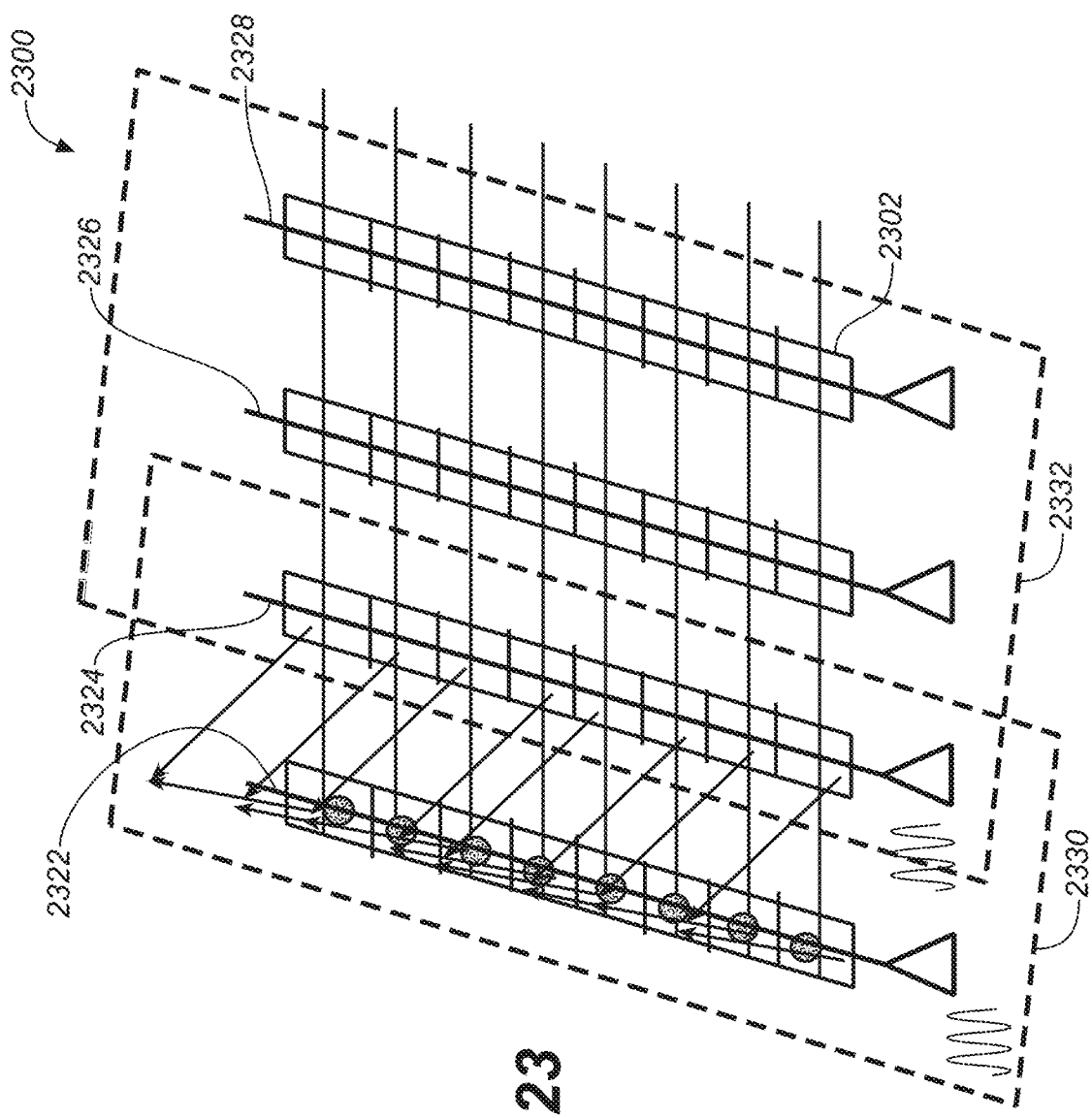
FIG. 23 illustrates an example ultrasonic transducer system with phase delayed transmission, according to some embodiments.

FIG. 23 illustrates another example ultrasonic transducer system 2300 with phase delayed transmission, according to some embodiments. As illustrated, FIG. 23 shows ultrasonic beam transmission and reception using a virtual block of two-dimensional, 24-element, ultrasonic transducers that form a subset of a 32-element ultrasonic transducer system 2300 having phase delayed inputs. In operation, an array position 2330 (represented by the dotted line), also referred to herein as a virtual block, includes columns 2322 and 2324 of ultrasonic transducers 2302. At an initial time, column 2324 of array position 2330 is triggered to emit ultrasonic waves at an initial time. At a second time (e.g., several nanoseconds later), column 2322 of array position 2330 is triggered. The ultrasonic waves interfere with each other, substantially resulting in emission of a high intensity ultrasonic plane wave centered on column 2322. In one embodiment, the ultrasonic transducers 2302 in column 2324 is switched off, while column 2322 is switched from a transmission mode to a reception mode, allowing detection of any reflected signals.

In one embodiment, after the activation of ultrasonic transducers 2302 of array position 2330, ultrasonic transducers 2302 of another array position 2332, comprised of columns 2324, 2326, and 2328 of ultrasonic transducers 2302 are activated. In operation, at an initial time, columns 2324 and 2328 of array position 2332 are triggered to emit ultrasonic waves at an initial time. At a second time (e.g., several nanoseconds later), column 2326 of array position 2332 is triggered. The ultrasonic waves interfere with each other, substantially resulting in emission of a high intensity ultrasonic plane wave centered on column 2326. In one embodiment, the ultrasonic transducers 2302 in columns 2324 and 2328 are switched off, while column 2326 is switched from a transmission mode to a reception mode, allowing detection of any reflected signals. In one embodiment, ultrasonic transducers 2302 of another array position 2332 are activated after a detection of a reflected ultrasonic signal at column 2322 of array position 2330. It should be appreciated that while movement of the array position by two columns of ultrasonic transducers is illustrated, movement by one, three, or more columns rightward or leftward is contemplated, as is movement by one or more rows, or by movement by both some determined number of rows and columns. In various embodiments, successive array positions can be either overlapping in part, or can be distinct. In some embodiments the size of array positions can be varied. In various embodiments, the number of ultrasonic transducers 2302 of an array position for emitting ultrasonic waves can be larger than the number of ultrasonic transducers 2302 of an array position for ultrasonic reception. In still other embodiments, array positions can be square, rectangular, ellipsoidal, circular, or more complex shapes such as crosses.

Example ultrasonic transducer system 2300 is operable to beamform a line of a high intensity ultrasonic wave centered over a column of ultrasonic transducers. It should be appreciated that the principles illustrated in FIG. 23 for beamforming a line using columns of ultrasonic transducers is applicable to embodiments for beamforming a point using ultrasonic transducers, as will be explained below. For instance, example ultrasonic transducer system 2300 includes columns of ultrasonic transducers in which the ultrasonic transducers of each column are jointly operated to activate at the same time, operating to beamform along a line. It should be appreciated that the ultrasonic transducers of a two-dimensional array may be independently operable, and used for beamform points as well, as will be described below.

FIGS. 24A, 24B, 25A and 25B illustrate example phase delay patterns for a 5×5 ultrasonic transducer blocks, according to some embodiments. As illustrated in 24A, 24B, 25A and 25B, each number in the ultrasonic transducer array is equivalent to the nanosecond delay used during operation, and an empty element (e.g., no number) in the ultrasonic transducer blocks 2400, 2410, 2500 and 2510 means that an ultrasonic transducer is not activated for signal transmission during operation. In various embodiments, ultrasonic wave amplitude can be the same or similar for each activated ultrasonic transducer, or can be selectively increased or decreased relative to other ultrasonic transducers. It should be appreciated that the phase delay patterns described in accordance with FIGS. 24A, 24B, 25A and 25B are asymmetric about the focal point where a beam contacts an object.

Figure 24A:
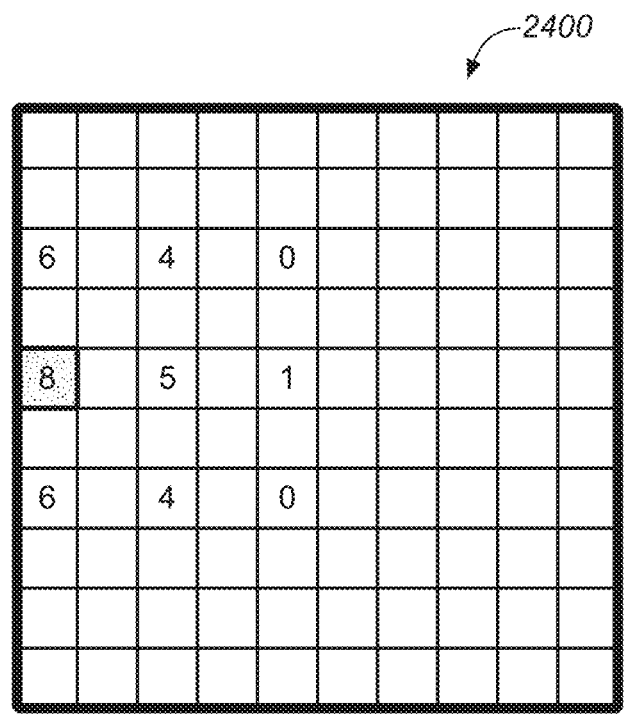
FIGS. 24A and 24B illustrate example phase delay patterns for a 5×5 ultrasonic transducer block, according to some embodiments.

FIG. 24A illustrates an example phase delay pattern for an array position of ultrasonic transducers at an edge of a two-dimensional array of ultrasonic transducers. Because ultrasonic transducer block 2400 is located at an edge, a symmetrical phase delay pattern about a center of ultrasonic transducer block 2400 is not available. In the illustrated pattern, initial ultrasonic transducer activation is limited to rightmost corners of the array, followed by selected action of ultrasonic transducers at 1, 4, 5, 6, and 8 nanosecond intervals. Together, the activated ultrasonic transducers generate an ultrasonic beam centered on the 8 nanosecond delayed ultrasonic transducer indicated in gray. In one embodiment, so as to reduce issues with crosstalk and heating, each activated ultrasonic transducer is equidistant from each other, being surrounded by un-activated ultrasonic transducer.

Figure 24B:
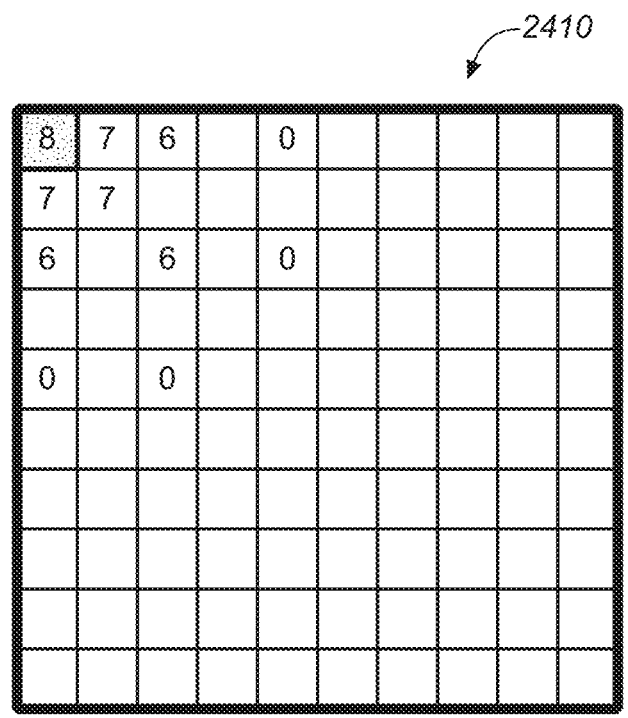

FIG. 24B illustrates an example phase delay pattern for a 5×5 ultrasonic transducer block 2410 in a corner of a two-dimensional array of ultrasonic transducers, with equi-distant spacing of transmitting ultrasonic transducers. Like the phase delay timing pattern of FIG. 24A, the initial ultrasonic transducer activation is asymmetrical. Together, the activated ultrasonic transducers generate an ultrasonic beam centered on the 8 nanosecond delayed ultrasonic transducer indicated in gray. Adjacent ultrasonic transducers are activated in this embodiment to increase beam intensity.

Figure 25A:
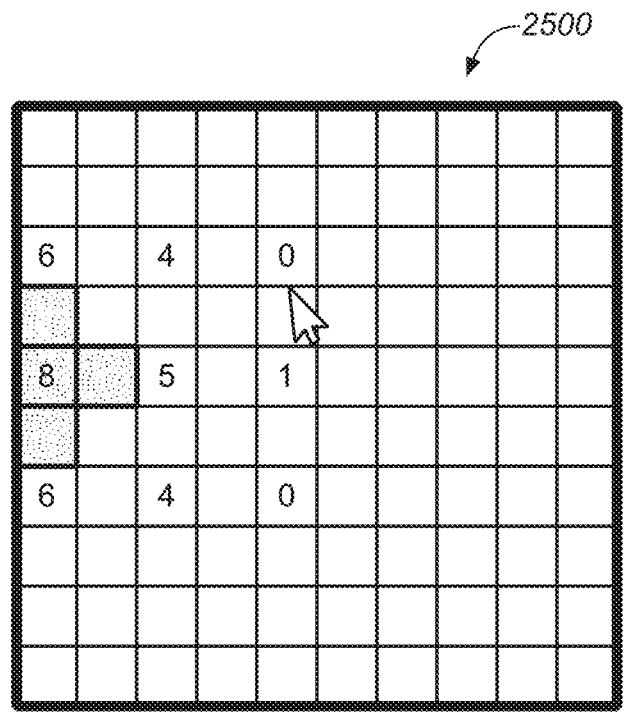
FIGS. 25A and 25B illustrate another example phase delay pattern for a 5×5 ultrasonic transducer block, according to some embodiments.

FIG. 25A illustrates an example phase delay pattern for an array position of ultrasonic transducers at an edge of a two-dimensional array of ultrasonic transducers. Because ultrasonic transducer block 2500 is located at an edge, a symmetrical phase delay pattern about a center of ultrasonic transducer block 2500 is not available. In the illustrated pattern, initial ultrasonic transducer activation is limited to rightmost corners of the array, followed by selected action of ultrasonic transducers at 1, 4, 5, 6, and 8 nanosecond intervals. Together, the activated ultrasonic transducers generate an ultrasonic beam centered on the 8 nanosecond delayed ultrasonic transducer indicated in gray. After beam transmit concludes, the gray (8 nanosecond) ultrasonic transducer is switched into a receive mode, along with those surrounding ultrasonic transducers indicated by spotted gray.

Figure 25B:
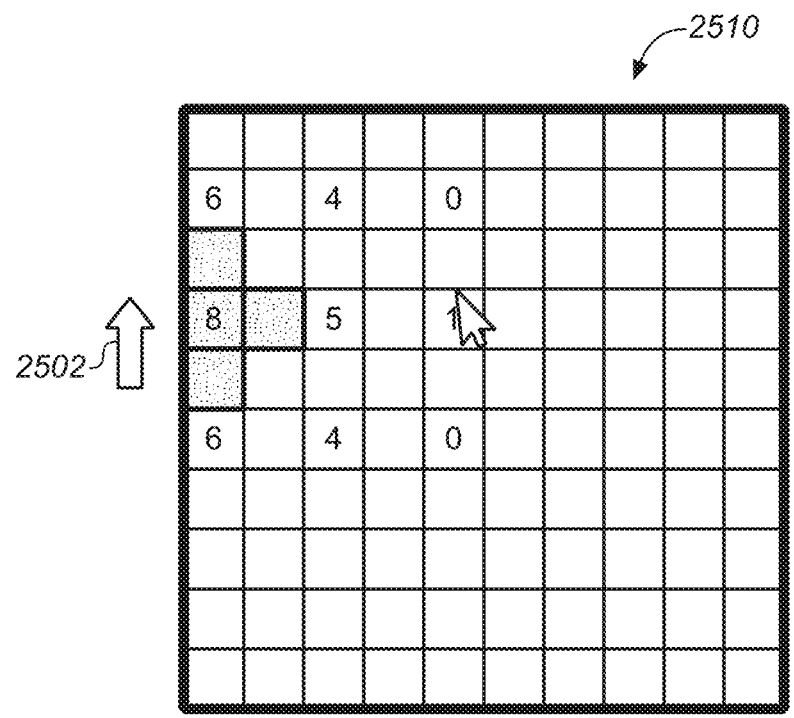

FIG. 25B illustrates ultrasonic transducer block 2510 is located at an edge of a two-dimensional array of ultrasonic transducers. This pattern is formed as ultrasonic transducer block 2500 is moved up a single row of ultrasonic transducers (indicated by arrow 2502) with respect to the phase delay pattern illustrated in FIG. 25A. As in FIG. 25A, the activated ultrasonic transducers together generate an ultrasonic beam centered on the 8 nanosecond delayed ultrasonic transducer indicated in gray. After beam transmit concludes, the gray (8 nanosecond) ultrasonic transducer is switched into a receive mode, along with those surrounding ultrasonic transducers indicated by spotted gray.

Figure 26:
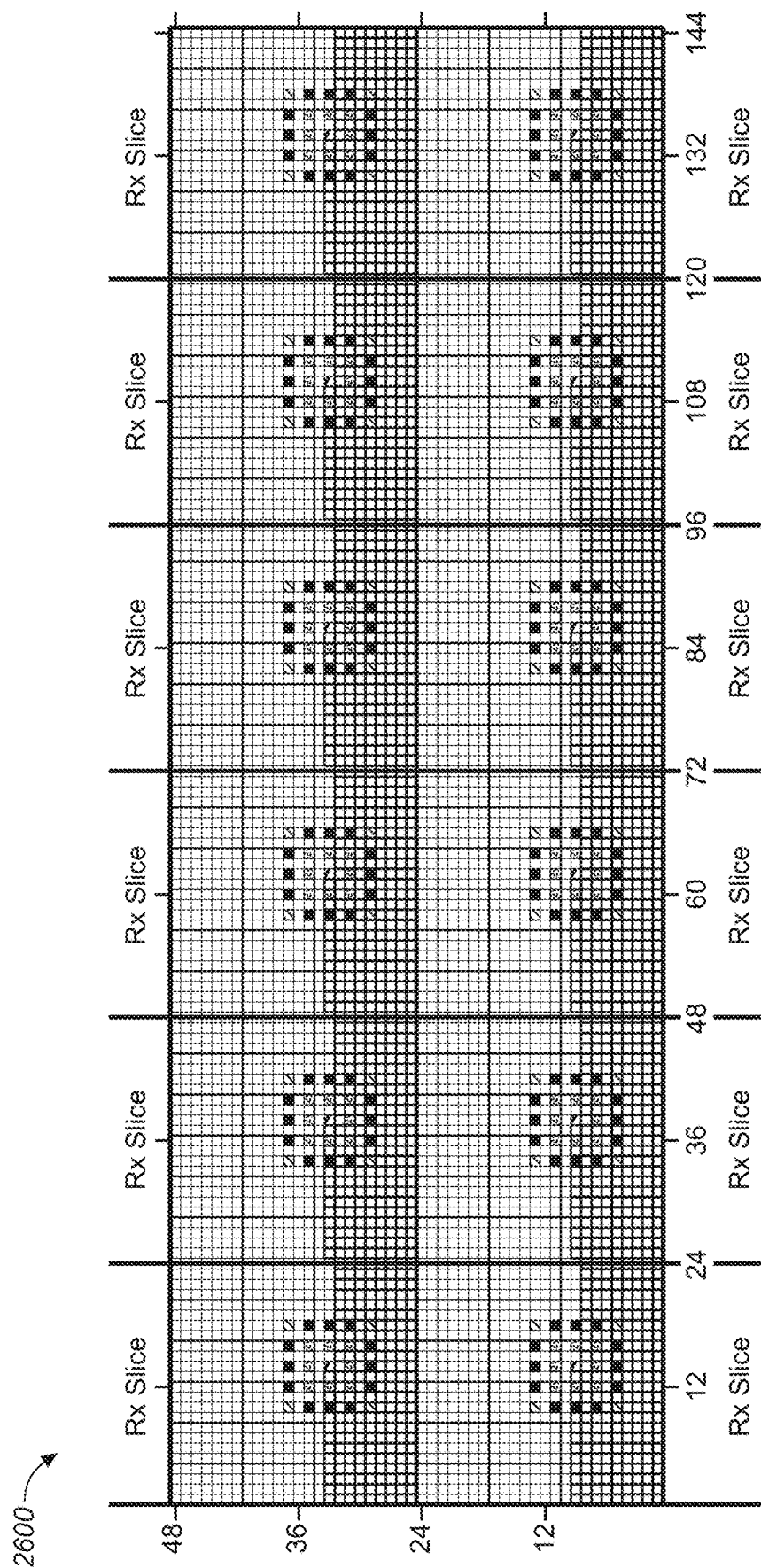
FIG. 26 illustrates example simultaneous operation of transmitter blocks for a multiple array positions in a two-dimensional array of ultrasonic transducers, according to some embodiments.

FIG. 26 illustrates example simultaneous operation of transmitter blocks for a multiple array positions in a two-dimensional array 2600 of ultrasonic transducers, according to some embodiments. As described above, a 9×9 array position can be used as a beamforming array for an ultrasound transducer. In the illustrated example, two-dimensional array 2600 is 48×144 ultrasonic transducers, separated into twelve identical 24×24 blocks. In one embodiment, a mux-based transmission/receive (Tx/Rx) timing control method can be used to activate the appropriate ultrasonic transducers in each block. When a sequence of activation to generate an ultrasound beam and sensing reflected echoes is completed, the 9×9 array position is moved rightward or leftward, or upward and downward, with respect to the drawing, and the sequence is repeated until substantially all ultrasonic transducers have emitted an ultrasonic beam.

As previously described, it should be appreciated that any type of activation sequence may be used (e.g., side-to-side, top-to-bottom, random, another predetermined order, row and/or column skipping, etc.) Moreover, it should be appreciated that FIG. 26 illustrates a phase delay pattern that is symmetric about a focal point of the transmitting pixels. As previously described, it is understood that different phase delay patterns may be used as a focal point approaches or is adjacent to an edge and/or corner of the two-dimensional array. For example, a phase delay pattern similar to that illustrated in FIG. 24A may be used as a focal point approaches or is adjacent to an edge of the two-dimensional array and a phase delay pattern similar to that illustrated in FIG. 24B may be used as a focal point approaches or is adjacent to corner of the two-dimensional array. In various embodiments, the ultrasonic transducers that are not available (e.g., outside the edge of a two-dimensional array 2600) are truncated from the activation pattern. For example, for a 9×9 array position, as the center ultrasonic transducer moves towards an edge such that the 9×9 array position extends over the edge of the two-dimensional array, rows, columns, or rows and columns (in the instance of corners) of ultrasonic transducers are truncated from the 9×9 array position. For instance, a 9×9 array position effectively becomes a 5×9 array position when the center ultrasonic transducer is along an edge of the two-dimensional array. Similarly, a 9×9 ultrasonic transducer block effectively becomes a 6×9 array position when the center ultrasonic transducer is one row or column from an edge of the two-dimensional array.

Moreover, it should be appreciated that in accordance with various embodiments, multiple phase delay patterns for sensing multiple pixels within an array position can be used for an array position. In other words, multiple pixels can be sensed within a single array position, thereby improving the resolution of a sensed image.

Figure 27:
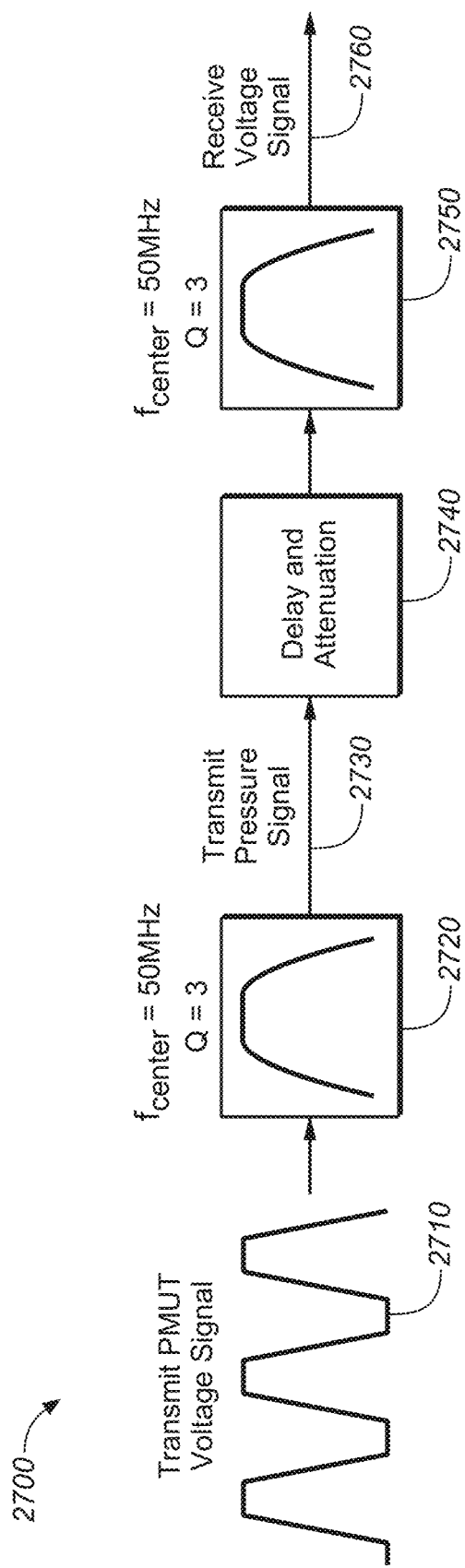
FIG. 27 illustrates an example operational model of a transmit signal to a receive signal of a two-dimensional array of ultrasonic transducers, according to some embodiments.

FIG. 27 illustrates an example operational model 2700 of a transmit signal to a receive signal of a two-dimensional array of ultrasonic transducers, according to some embodiments. FIG. 27 shows an operational model 2700 from voltage transmit signal into a PMUT array 2710 and ending with voltage receive signal from the PMUT array 2760. Three cycles of the voltage waveform are bandpass filtered by the PMUT 2720, sent out as an ultrasonic pressure signal 2730 that is attenuated and delayed by interaction with an object 2740, and then bandpass filtered by the PMUT array 2750 to create the final receive signal 2760. In the illustrated example, the PMUT bandpass filter response 2720 and 2750 is assumed to be centered at 50 MHz with Q of approximately 3, although other values may be used.

Figure 28:
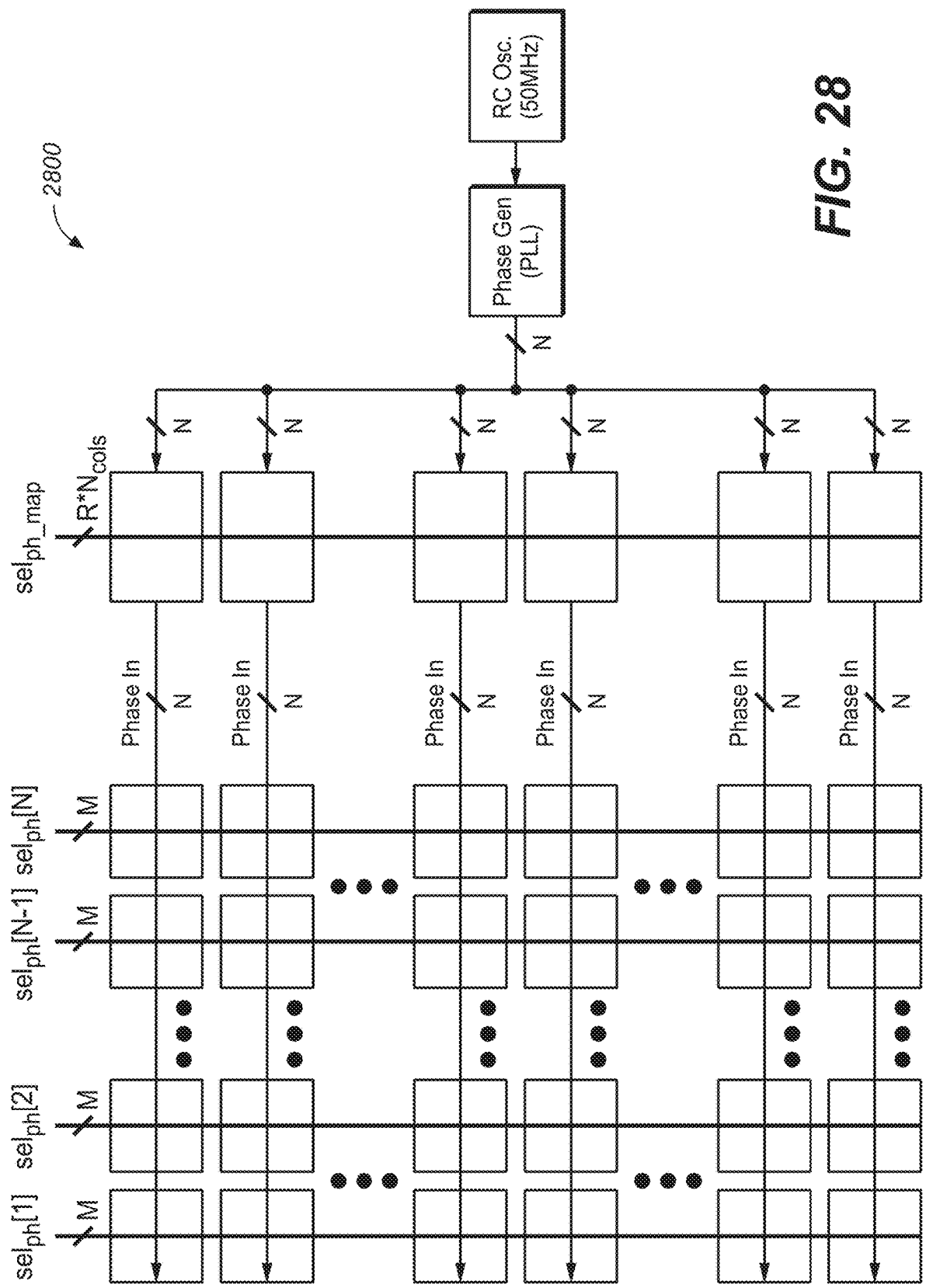
FIG. 28 illustrates an example transmit path architecture of a two-dimensional array of ultrasonic transducers, according to some embodiments.

FIG. 28 illustrates an example transmit path architecture 2800 of a two-dimensional array of ultrasonic transducers, according to some embodiments. Achieving two-dimensional beamforming with high image resolution under glass uses relatively high ultrasonic frequencies and precise timing. Electronics to support a PMUT array with a resonant frequency of 50 MHz and a beamforming timing resolution of 1 nanosecond can be used. The 50 MHz frequency can be generated by an on-chip RC oscillator that can be trimmed for sufficient accuracy by an off-chip clock source. The beamforming resolution can be set by an on-chip PLL that outputs several timing phases that correspond to ~3 cycles of 50 MHz frequency and are appropriately delayed with respect to each other. These phases can be routed to each PMUT according to the sel$_{ph\_map}$ signals shown in the FIG. 28.

Figure 29:
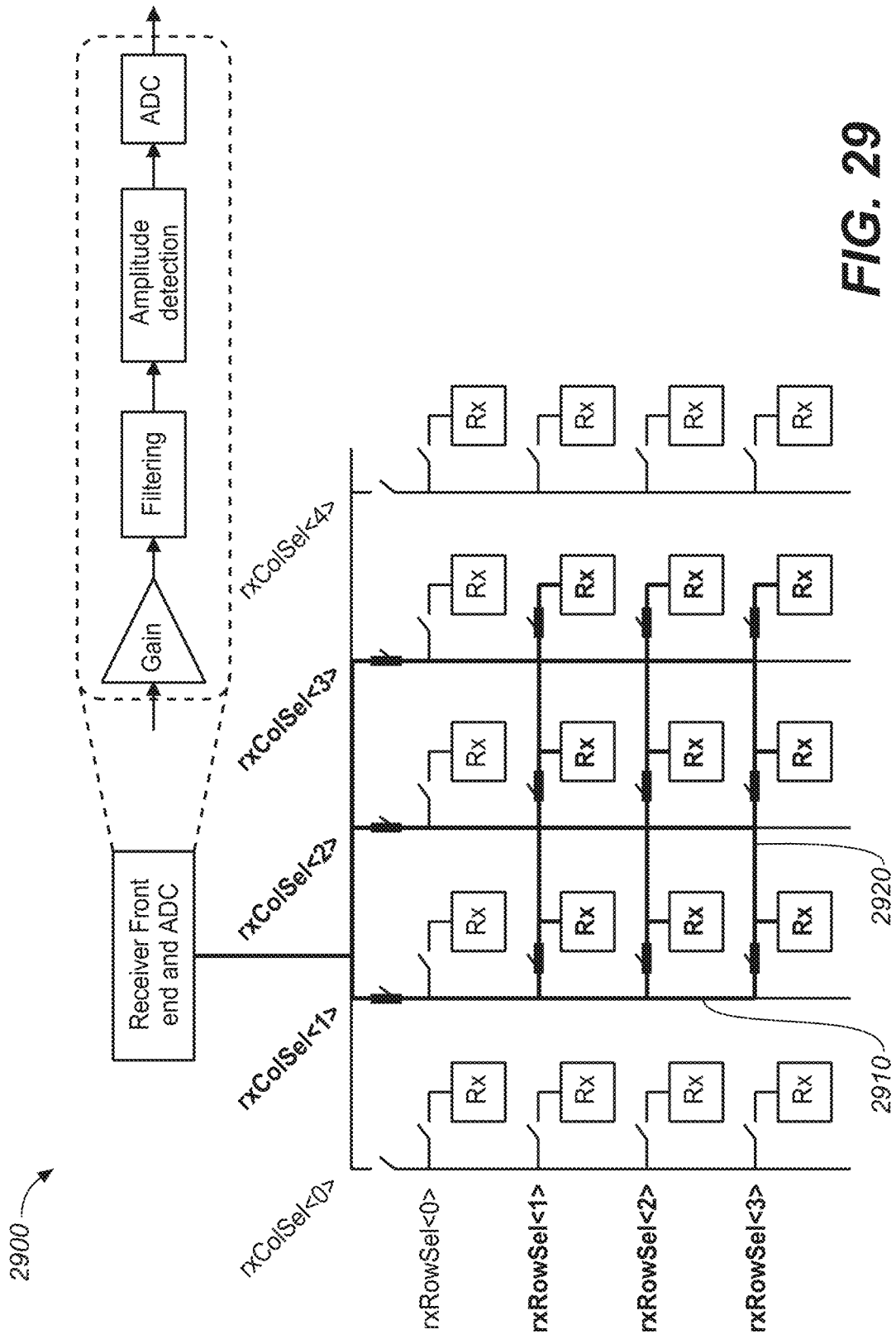
FIG. 29 illustrates an example receive path architecture of a two-dimensional array of ultrasonic transducers, according to some embodiments.

FIG. 29 illustrates an example receive path architecture of a two-dimensional array of ultrasonic transducers, according to some embodiments. The select lines 2910 correspond to rxColsel[k] for receive, and the select lines 2920 correspond to rxRowsel[k] for receive. Multiple PMUTs can be selected together for receiving the signal. The signal from the PMUTs is fed into a front end receiver. The signal is then filtered to reduce noise outside of the signal bandwidth. The filtered signal is then integrated and digitized with an ADC. In some embodiments, the PMUT and receiver layout allow straightforward extension of the PMUT array size, since different applications can require different sensor array areas. The number of receiver slices will be determined by the desired PMUT array size and minimum ultrasonic transducer separation between transmit beams. For example, in one embodiment, a 20 ultrasonic transducer minimum separation between adjacent sets of active ultrasonic transducers reduces crosstalk.

Figure 30B:
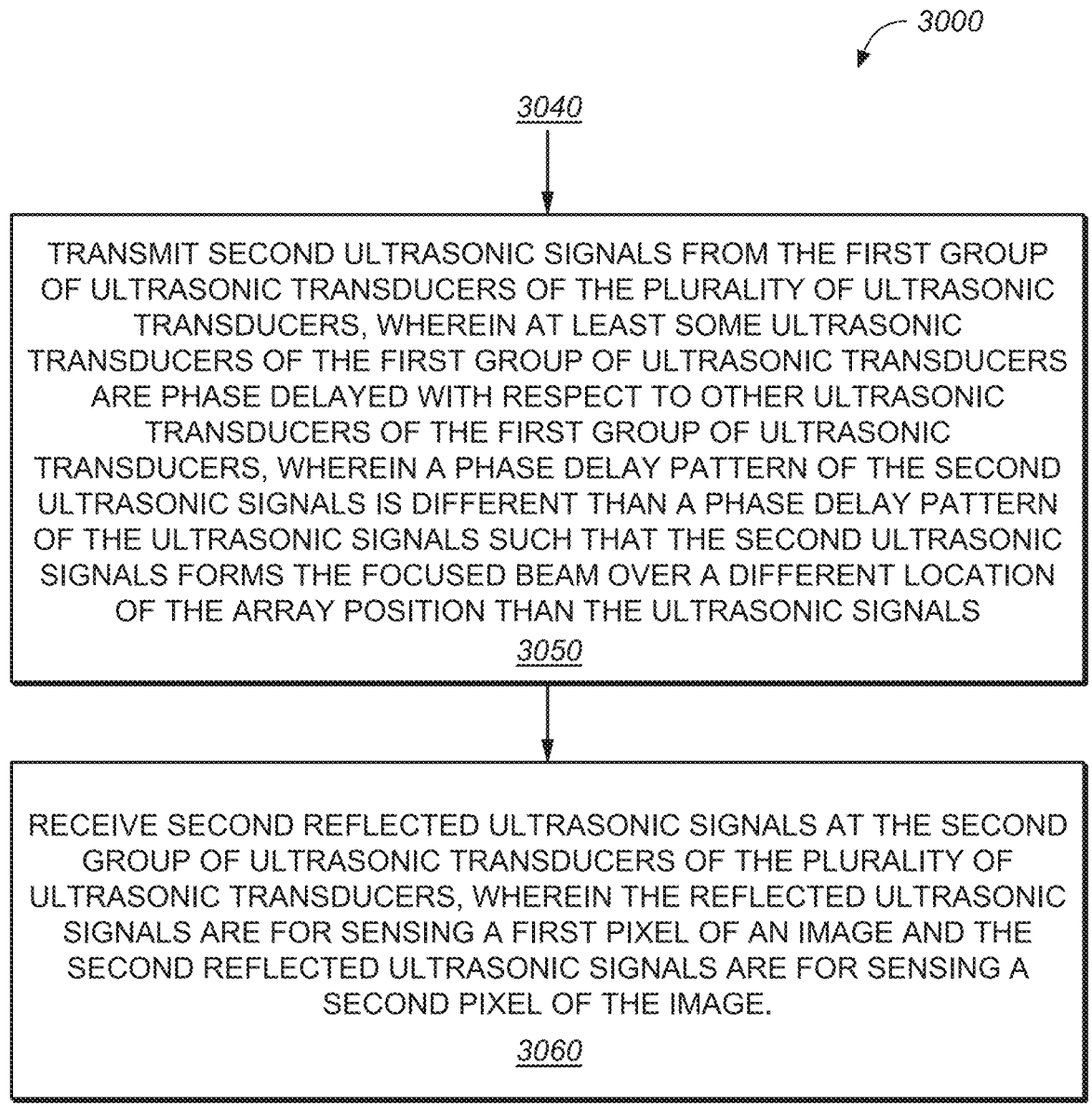

FIGS. 30, 30A and 30B illustrate a flow diagram 3000 of an example method for operating a two-dimensional array of ultrasonic transducers, according to various embodiments. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 3000 includes some procedures that, in various embodiments, are carried out by one or more processors under the control of computer-readable and computer-executable instructions that are stored on non-transitory computer-readable storage media. It is further appreciated that one or more procedures described in flow diagram 3000 may be implemented in hardware, or a combination of hardware with firmware and/or software.

With reference to FIG. 30A, at procedure 3010 of flow diagram 3000, a plurality of array positions comprising pluralities of ultrasonic transducers of the two-dimensional array of ultrasonic transducers is defined. The plurality of array positions each include a portion of ultrasonic transducers of the two dimensional array of ultrasonic transducers. In one embodiment, the ultrasonic transducers are Piezoelectric Micromachined Ultrasonic Transducer (PMUT) devices. In one embodiment, at least one array position of the plurality of array positions comprises ultrasonic transducers that are not activated.

In one embodiment, as shown at procedure 3012, an activation sequence of the plurality of array positions is defined.

At procedure 3020, for each array position of the plurality of array positions, a plurality of ultrasonic transducers associated with the respective array position are activated. In one embodiment, the plurality of array positions comprises a same amount of ultrasonic transducers having a uniform arrangement. In one embodiment, the activation of the plurality of ultrasonic transducers associated with the respective array position is performed according to the activation sequence.

In one embodiment, the activating a plurality of ultrasonic transducers associated with the respective array position is performed concurrently for at least two non-overlapping array positions of the plurality of array positions. In another embodiment, wherein the activating a plurality of ultrasonic transducers associated with the respective array position is performed consecutively for at least two overlapping array positions of the plurality of array positions offset by one row of ultrasonic transducers. In another embodiment, wherein the activating a plurality of ultrasonic transducers associated with the respective array position is performed consecutively for at least two overlapping array positions of the plurality of array positions offset by one column of ultrasonic transducers.

At procedure 3030, ultrasonic signals are transmitted from a first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers, the first group of ultrasonic transducers for forming a focused ultrasonic beam.

In one embodiment, a phase delay pattern of the first group of ultrasonic transducers is symmetric about two axes of the first group of ultrasonic transducers, wherein the two axes are orthogonal to each other. In another embodiment, a phase delay pattern of the first group of ultrasonic transducers is asymmetric about two axes of the first group of ultrasonic transducers, wherein the two axes are orthogonal to each other. In another embodiment, a phase delay pattern of the first group of ultrasonic transducers is symmetric about an axis of the first group of ultrasonic transducers. In one embodiment, the axis is orthogonal to an edge of the two-dimensional array of ultrasonic transducers. In one embodiment, the phase delay pattern of the first group of ultrasonic transducers is symmetric about the axis of the first group of ultrasonic transducers for an array position adjacent an edge of the two-dimensional array of ultrasonic transducers. In one embodiment, a phase delay pattern of the first group of ultrasonic transducers comprises at least three distinct timing phases.

At procedure 3040, reflected ultrasonic signals are received at a second group of ultrasonic transducers of the plurality of ultrasonic transducers. In one embodiment, the first group of ultrasonic transducers and the second group of ultrasonic transducers comprise different ultrasonic transducers of each respective array position of the plurality of ultrasonic transducers. In one embodiment, at least one ultrasonic transducer is comprised within both the first group of ultrasonic transducers and the second group of ultrasonic transducers.

With reference to FIG. 30B, in one embodiment, upon completion of procedure 3040, flow diagram 3000 proceeds to procedure 3050. At procedure 3050, second ultrasonic signals are transmitted from the first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers, wherein a phase delay pattern of the second ultrasonic signals is different than a phase delay pattern of the ultrasonic signals such that the second ultrasonic signals forms the focused beam over a different location of the array position than the ultrasonic signals. In one embodiment, provided an array position of the plurality of array positions extends over an edge of the two-dimensional array, ultrasonic transducers of the first group of ultrasonic transducers are truncated from the array position that extend over the edge of the two-dimensional array.

In one embodiment, as shown at procedure 3060, second reflected ultrasonic signals are received at the second group of ultrasonic transducers of the plurality of ultrasonic transducers, wherein the reflected ultrasonic signals are for sensing a first pixel of an image and the second reflected ultrasonic signals are for sensing a second pixel of the image.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method of operating a two-dimensional array of ultrasonic transducers, the method comprising:
    defining a plurality of array positions comprising pluralities of ultrasonic transducers of the two-dimensional array of ultrasonic transducers, the plurality of array positions each comprising a portion of ultrasonic transducers of the two-dimensional array of ultrasonic transducers, wherein the plurality of array positions are for capturing an image over the two-dimensional array of ultrasonic transducers;
    defining an activation sequence of the plurality of array positions, wherein the activation sequence defines movement of the plurality array positions over the two-dimensional array of ultrasonic transducers for forming a focused ultrasonic beam at different locations over the two-dimensional array of ultrasonic transducers;
    for each array position of the plurality of array positions, activating a plurality of ultrasonic transducers associated with the respective array position for capturing a pixel of the image, the activating comprising:
        transmitting ultrasonic signals from a first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers, the first group of ultrasonic transducers for forming a focused ultrasonic beam focused to a contact surface of a platen overlying the two-dimensional array of ultrasonic transducers for reflecting off an object in contact with the contact surface; and
        receiving reflected ultrasonic signals at a second group of ultrasonic transducers of the plurality of ultrasonic transducers, wherein the first group of ultrasonic transducers and the second group of ultrasonic transducers comprise different ultrasonic transducers for each respective array position of the plurality of array positions; and
    performing the activating a plurality of ultrasonic transducers associated with the respective array position according to the activation sequence for each array position of the plurality of array positions.

2. The method of claim 1, wherein the ultrasonic transducers are Piezoelectric Micromachined Ultrasonic Transducer (PMUT) devices.

3. The method of claim 1, wherein a phase delay pattern of the first group of ultrasonic transducers is symmetric about two axes of the first group of ultrasonic transducers, wherein the two axes are orthogonal to each other.

4. The method of claim 1, wherein a phase delay pattern of the first group of ultrasonic transducers is asymmetric about two axes of the first group of ultrasonic transducers, wherein the two axes are orthogonal to each other.

5. The method of claim 1, wherein a phase delay pattern of the first group of ultrasonic transducers is symmetric about an axis of the first group of ultrasonic transducers.

6. The method of claim 5, wherein the axis is orthogonal to an edge of the two-dimensional array of ultrasonic transducers.

7. The method of claim 5, wherein the phase delay pattern of the first group of ultrasonic transducers is symmetric about the axis of the first group of ultrasonic transducers for an array position adjacent an edge of the two-dimensional array of ultrasonic transducers.

8. The method of claim 1, wherein a phase delay pattern of the first group of ultrasonic transducers comprises at least three distinct timing phases.

9. The method of claim 1, wherein the plurality of array positions comprise a same amount of ultrasonic transducers having a uniform arrangement.

10. The method of claim 1, wherein the activating a plurality of ultrasonic transducers associated with the respective array position is performed concurrently for at least two non-overlapping array positions of the plurality of array positions.

11. The method of claim 1, wherein the activating a plurality of ultrasonic transducers associated with the respective array position is performed consecutively for at least two overlapping array positions of the plurality of array positions offset by one row of ultrasonic transducers.

12. The method of claim 1, wherein the activating a plurality of ultrasonic transducers associated with the respective array position is performed consecutively for at least two overlapping array positions of the plurality of array positions offset by one column of ultrasonic transducers.

13. The method of claim 1, wherein at least one array position of the plurality of array positions comprises ultrasonic transducers that are not activated.

14. The method of claim 1, wherein at least one ultrasonic transducer is comprised within both the first group of ultrasonic transducers and the second group of ultrasonic transducers.

15. The method of claim 1, wherein the activating comprises:
- transmitting second ultrasonic signals from the first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers, wherein a phase delay pattern of the second ultrasonic signals is different than a phase delay pattern of the ultrasonic signals such that the second ultrasonic signals forms the focused ultrasonic beam focused to the contact surface of the platen over a different location of the array position than the ultrasonic signals; and
- receiving second reflected ultrasonic signals at the second group of ultrasonic transducers of the plurality of ultrasonic transducers, wherein the reflected ultrasonic signals are for sensing a first pixel of the image and the second reflected ultrasonic signals are for sensing a second pixel of the image.

16. The method of claim 1, wherein the transmitting ultrasonic signals from a first group of ultrasonic transducers of the plurality of ultrasonic transducers comprises:
- provided an array position of the plurality of array positions extends over an edge of the two-dimensional array, truncating ultrasonic transducers of the first group of ultrasonic transducers from the array position that extend over the edge of the two-dimensional array.

17. A method of operating a two-dimensional array of ultrasonic transducers, the method comprising:
- defining a plurality of array positions comprising pluralities of ultrasonic transducers of the two-dimensional array of ultrasonic transducers, wherein the plurality of array positions are for capturing an image over the two-dimensional array;
- defining an activation sequence of the plurality of array positions, wherein the activation sequence defines movement of the plurality array positions over the two-dimensional array of ultrasonic transducers for forming a focused ultrasonic beam at different locations over the two-dimensional array of ultrasonic transducers;
- for a first array position of the plurality of array positions, activating a first plurality of ultrasonic transducers associated with the first array position for capturing a first pixel of the image, the activating the first plurality of ultrasonic transducers comprising:
  - transmitting ultrasonic signals from a first group of ultrasonic transducers of the first plurality of ultrasonic transducers, wherein at least some ultrasonic transducers of the first group of ultrasonic transducers of the first plurality of ultrasonic transducers are phase delayed with respect to other ultrasonic transducers of the first group of ultrasonic transducers of the first plurality of ultrasonic transducers, the first group of ultrasonic transducers for forming a focused ultrasonic beam focused to a contact surface of a platen overlying the two-dimensional array of ultrasonic transducers for reflecting off an object in contact with the contact surface; and
  - receiving reflected ultrasonic signals at a second group of ultrasonic transducers of the first plurality of ultrasonic transducers, wherein the first group of ultrasonic transducers of the first plurality of ultrasonic transducers and the second group of ultrasonic transducers of the first plurality of ultrasonic transducers comprise different ultrasonic transducers; and
- subsequent the activating the first plurality of ultrasonic transducers, for a second array position of the plurality of array positions, activating a second plurality of ultrasonic transducers associated with the second array position for capturing a second pixel of the image, wherein the second plurality of ultrasonic transducers overlaps the first plurality of ultrasonic transducers, the activating the second plurality of ultrasonic transducers comprising:
  - transmitting ultrasonic signals from a first group of ultrasonic transducers of the second plurality of ultrasonic transducers, wherein at least some ultrasonic transducers of the first group of ultrasonic transducers of the second plurality of ultrasonic transducers are phase delayed with respect to other ultrasonic transducers of the first group of ultrasonic transducers of the second plurality of ultrasonic transducers, the first group of ultrasonic transducers of the second plurality of ultrasonic transducers for forming a focused ultrasonic beam focused to the contact surface of the platen overlying the two-dimensional array of ultrasonic transducers for reflecting off the object in contact with the contact surface; and
  - receiving reflected ultrasonic signals at a second group of ultrasonic transducers of the second plurality of ultrasonic transducers, wherein the first group of ultrasonic transducers of the second plurality of ultrasonic transducers and the second group of ultrasonic transducers of the second plurality of ultrasonic transducers comprise different ultrasonic transducers.

18. A method of operating a two-dimensional array of ultrasonic transducers, the method comprising:
- for an array position of the two-dimensional array of ultrasonic transducers, the array position comprising a plurality of ultrasonic transducers of the two-dimensional array of ultrasonic transducers, activating a plurality of ultrasonic transducers associated with the array position, the activating comprising:
  - transmitting first ultrasonic signals from a first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers according to a first phase delay pattern, the first group of ultrasonic transducers for forming a focused ultrasonic beam focused to a contact surface of a platen overlying the two-dimensional array of ultrasonic transducers for reflecting off an object in contact with the contact surface, wherein the first ultrasonic signals form the focused ultrasonic beam over a first location of the array position;
  - receiving first reflected ultrasonic signals at a second group of ultrasonic transducers of the plurality of ultrasonic transducers, the first reflected ultrasonic signals for sensing a first pixel of an image, wherein the first reflected ultrasonic signals are generated based on reflections of the first ultrasonic signals;

transmitting second ultrasonic signals from a third group of ultrasonic transducers of the plurality of ultrasonic transducers, wherein at least some ultrasonic transducers of the third group of ultrasonic transducers are phase delayed with respect to other ultrasonic transducers of the third group of ultrasonic transducers according to a second phase delay pattern different than the first phase delay pattern, wherein the second ultrasonic signals form the focused ultrasonic beam focused to the contact surface of the platen over a second location of the array position; and receiving second reflected ultrasonic signals at a fourth group of ultrasonic transducers of the plurality of ultrasonic transducers, the second reflected ultrasonic signals for sensing a second pixel of the image, wherein the second reflected ultrasonic signals are generated based on reflections of the second ultrasonic signals.

19. The method of claim 18, wherein the ultrasonic transducers are Piezoelectric Micromachined Ultrasonic Transducer (PMUT) devices.

20. The method of claim 18, the first phase delay pattern is symmetric about the first location.

21. The method of claim 18, the second phase delay pattern is symmetric about the second location.

22. The method of claim 18, the first phase delay pattern is asymmetric about the first location.

23. The method of claim 18, the second phase delay pattern is asymmetric about the second location.

24. The method of claim 18, wherein the first phase delay pattern comprises at least three distinct timing phases.

25. The method of claim 18, wherein the second phase delay pattern comprises at least three distinct timing phases.

26. The method of claim 18, further comprising:
defining a plurality of array positions comprising pluralities of ultrasonic transducers of the two-dimensional array of ultrasonic transducers; and for each array position of the plurality of array positions, performing the activating the plurality of ultrasonic transducers associated with each respective array position.

27. The method of claim 26, wherein the activating a plurality of ultrasonic transducers associated with the respective array position is performed concurrently for at least two non-overlapping array positions of the plurality of array positions.

28. The method of claim 26, wherein the activating a plurality of ultrasonic transducers associated with the respective array position is performed consecutively for at least two overlapping array positions of the plurality of array positions offset by one row of ultrasonic transducers.

29. The method of claim 26, wherein the activating a plurality of ultrasonic transducers associated with the respective array position is performed consecutively for at least two overlapping array positions of the plurality of array positions offset by one column of ultrasonic transducers.

30. The method of claim 26, further comprising:
defining an activation sequence of the plurality of array positions; and
performing the activating a plurality of ultrasonic transducers associated with the respective array position according to the activation sequence.

31. The method of claim 26, wherein at least one array position of the plurality of array positions comprises ultrasonic transducers that are not activated.

32. The method of claim 26, wherein the first group of ultrasonic transducers and the second group of ultrasonic transducers comprise different ultrasonic transducers of each respective array position of the plurality of ultrasonic transducers.

33. The method of claim 26, wherein at least one ultrasonic transducer is comprised within both the first group of ultrasonic transducers and the second group of ultrasonic transducers.

* * * * *